United States Patent
Aoki

(10) Patent No.: US 10,971,742 B2
(45) Date of Patent: Apr. 6, 2021

(54) FUEL CELL STATE DETERMINATION METHOD AND FUEL CELL STATE DETERMINATION APPARATUS

(71) Applicant: NISSAN MOTOR CO., LTD., Yokohama (JP)

(72) Inventor: Tetsuya Aoki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 488 days.

(21) Appl. No.: 15/765,634

(22) PCT Filed: Oct. 5, 2015

(86) PCT No.: PCT/JP2015/078246
§ 371 (c)(1),
(2) Date: Apr. 3, 2018

(87) PCT Pub. No.: WO2017/060962
PCT Pub. Date: Apr. 13, 2017

(65) Prior Publication Data
US 2020/0153008 A1 May 14, 2020

(51) Int. Cl.
*H01M 8/0438* (2016.01)
*H01M 8/04089* (2016.01)
*H01M 8/04537* (2016.01)
*H01M 8/04746* (2016.01)

(52) U.S. Cl.
CPC ... *H01M 8/04395* (2013.01); *H01M 8/04089* (2013.01); *H01M 8/04388* (2013.01); *H01M 8/04559* (2013.01); *H01M 8/04589* (2013.01); *H01M 8/04649* (2013.01); *H01M 8/04753* (2013.01)

(58) Field of Classification Search
CPC .................................................. H01M 8/04395
See application file for complete search history.

(56) References Cited

U.S. PATENT DOCUMENTS

| | | | | |
|---|---|---|---|---|
| 5,939,218 A | * | 8/1999 | Mizuno | H01M 8/04223 429/432 |
| 2007/0009773 A1 | | 1/2007 | Xie | |
| 2009/0286109 A1 | * | 11/2009 | Araki | H01M 8/04388 429/483 |
| 2017/0373331 A1 | | 12/2017 | Aoki | |

FOREIGN PATENT DOCUMENTS

| | | | |
|---|---|---|---|
| EP | 3 267 523 A1 | 1/2018 |
| JP | 3-226973 A | 10/1991 |
| JP | 2004-349050 A | 12/2004 |
| JP | 2013-8568 A | 1/2013 |
| JP | 2013-191362 A | 9/2013 |
| WO | WO 2016/103462 A1 | 6/2016 |

* cited by examiner

Primary Examiner — Brian R Ohara
(74) Attorney, Agent, or Firm — Foley & Lardner LLP

(57) ABSTRACT

In a fuel cell state determination method for determining an internal state of a fuel cell supplied with an anode gas and a cathode gas to generate electricity, a decrease of a reaction resistance value of the cathode caused by hydrogen evolution reaction generated in the cathode as the fuel cell has an oxygen deficiency state is detected, and the oxygen deficiency state is determined on the basis of detection of the decrease of the reaction resistance value.

19 Claims, 14 Drawing Sheets

FUEL CELL STATE DETERMINATION METHOD AND FUEL CELL STATE DETERMINATION APPARATUS

TECHNICAL FIELD

The present invention relates to a fuel cell state determination method and a fuel cell state determination apparatus.

BACKGROUND ART

There is known a fuel cell state determination apparatus that measures an internal impedance value of a fuel cell and detects an internal state of the fuel cell on the basis of the measured value.

For example, JP2013-8568A discusses a fuel cell state diagnosis device that diagnoses an internal state of a fuel cell by distinguishing between deficiency of a fuel gas (anode gas) and deficiency of an oxidation gas (cathode gas) on the basis of a measurement value of the internal impedance.

In this fuel cell state diagnosis device, when an internal impedance obtained in the vicinity of a cathode outlet port of the fuel cell increases, it is determined that deficiency is generated in the cathode gas.

SUMMARY OF INVENTION

However, since progression of the oxygen deficiency and an increase of the internal impedance do not necessarily relate with each other, it is difficult to accurately determine the oxygen deficiency state in some cases. Therefore, it is desirable to provide a novel method of determining the oxygen deficiency.

In view of the aforementioned problems, it is therefore an object of the present invention to provide a fuel cell state determination method and a fuel cell state determination apparatus, by which oxygen deficiency in the fuel cell can be appropriately determined.

According to an aspect of the invention, a fuel cell state determination method for determining an internal state of a fuel cell supplied with an anode gas and a cathode gas to generate electricity is provided. The method includes detecting a decrease of a reaction resistance value of the cathode caused by hydrogen evolution reaction generated in the cathode as the fuel cell has an oxygen deficiency state, and determining the oxygen deficiency state on the basis of detection of the decrease of the reaction resistance value.

DESCRIPTION OF EMBODIMENTS

Embodiments of the invention will now be described with reference to the accompanying drawings.

A fuel cell includes an anode as a fuel electrode, a cathode as an oxidant electrode, and an electrolyte membrane interposed therebetween. In the fuel cell, an anode gas containing hydrogen is supplied to the anode, and a cathode gas containing oxygen is supplied to the cathode, so that electricity is generated using these gases. A main electrode reaction progressing during electricity generation in both the anode and the cathode can be expressed as follows.

$$\text{Anode: } 2H_2 \rightarrow 4H^+ + 4e^- \qquad (1)$$

$$\text{Cathode: } 4H^+ + 4e^- + O_2 \rightarrow 2H_2O \qquad (2)$$

First Embodiment

Figure 1:
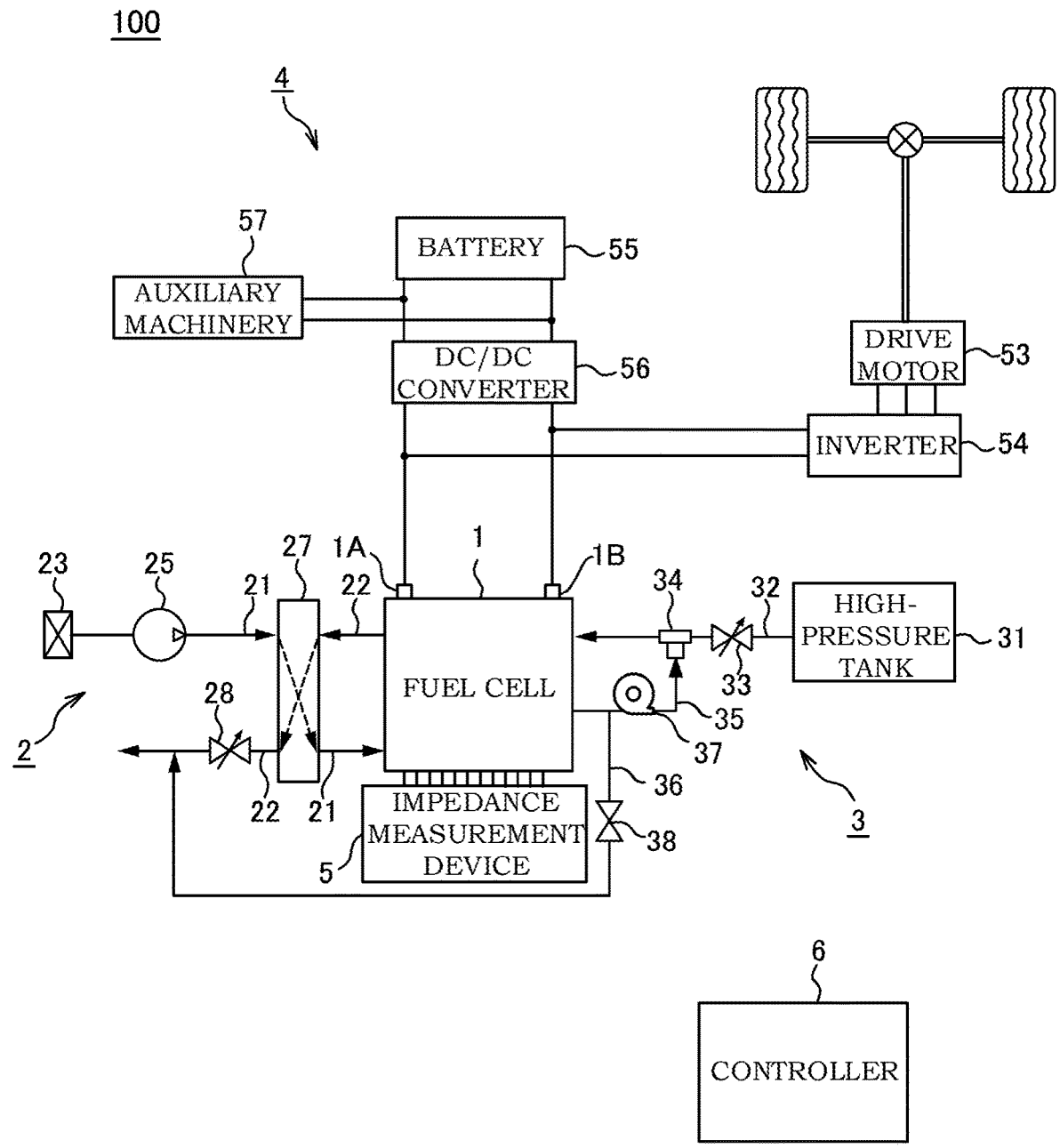
FIG. 1 is a schematic block diagram illustrating a fuel cell system according to an embodiment of the invention.

FIG. 1 is a schematic diagram illustrating a fuel cell system 100 according to an embodiment of the invention.

The fuel cell system 100 includes a fuel cell stack 1, a cathode gas supply/discharge device 2, an anode gas supply/discharge device 3, a power system 4, an impedance measurement device 5, and a controller 6.

The fuel cell stack 1 is a stacked battery obtained by stacking two or more fuel cells (unit cells). The fuel cell stack 1 is supplied with the anode gas and the cathode gas and generates electricity necessary to drive a vehicle. The fuel cell stack 1 has an anode-side terminal 1A and a cathode-side terminal 1B as an output terminal for outputting electric power.

The cathode gas supply/discharge device 2 supplies the cathode gas to the fuel cell stack 1 and discharges a cathode off-gas from the fuel cell stack 1 to the outside. The cathode gas supply/discharge device 2 includes a cathode gas supply passage 21, a cathode gas discharge passage 22, a filter 23, a cathode compressor 25, a water recovery device (WRD) 27, and a cathode pressure control valve 28.

The cathode gas supply passage 21 is a passage through which the cathode gas supplied to the fuel cell stack 1 flows. One end of the cathode gas supply passage 21 is connected to the filter 23, and the other end is connected to a cathode gas inlet port of the fuel cell stack 1.

The cathode gas discharge passage 22 is a passage through which the cathode off-gas discharged from the fuel cell stack 1 flows. One end of the cathode gas discharge passage 22 is connected to a cathode gas outlet port of the fuel cell stack 1, and the other end is formed as an opening end. The cathode off-gas is a gas mixture containing the cathode gas or steam generated from the electrode reaction or the like.

The filter 23 is a member for removing dirt or dust or the like contained in the cathode gas flowing into the cathode gas supply passage 21.

The cathode compressor 25 is provided in the cathode gas supply passage 21 in the downstream side of the filter 23. The cathode compressor 25 compresses the cathode gas inside the cathode gas supply passage 21 and supplies the cathode gas to the fuel cell stack 1.

The WRD 27 spans the cathode gas supply passage 21 and the cathode gas discharge passage 22 and is connected to the cathode gas supply passage 21 and the cathode gas discharge passage 22. The WRD 27 is a device that recovers moisture in the cathode off-gas flowing through the cathode gas discharge passage 22 and humidifies the cathode gas flowing through the cathode gas supply passage 21 using the recovered moisture.

The cathode pressure control valve 28 is provided in the cathode gas discharge passage 22 in the downstream of the WRD 27. The open/close operation of the cathode pressure control valve 28 is controlled by the controller 6 to regulate a pressure of the cathode gas supplied to the fuel cell stack 1.

Note that the cathode gas supply passage 21 is provided with various measurement sensors (not shown) such as an air flow sensor for detecting a flow rate of the cathode gas supplied to the fuel cell stack 1 or a cathode pressure sensor for detecting a pressure of the cathode gas supplied to the fuel cell stack 1.

Next, the anode gas supply/discharge device 3 will be described.

The anode gas supply/discharge device 3 supplies and circulates the anode gas to the fuel cell stack 1 and discharges the anode off-gas discharged from the fuel cell stack 1 to the cathode gas discharge passage 22. The anode gas supply/discharge device 3 includes a high-pressure tank 31, an anode gas supply passage 32, an anode pressure control valve 33, an ejector 34, an anode gas circulation passage 35, a purge passage 36, a hydrogen circulation pump 37, and a purge valve 38.

The high-pressure tank 31 is a container for storing the anode gas supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31, and the other end is connected to the ejector 34.

The anode pressure control valve 33 is provided in the anode gas supply passage 32 in the downstream of the high-pressure tank 31. The open/close operation of the anode pressure control valve 33 is controlled by the controller 6 to regulate the pressure of the anode gas supplied to the fuel cell stack 1. Alternatively, the anode gas supply passage 32 may additionally have, for example, a measurement device such as an anode pressure sensor for detecting a pressure of the anode gas.

The ejector 34 is provided in a coupling portion between the anode gas supply passage 32 and the anode gas circulation passage 35. The ejector 34 recirculates the anode gas supplied from the high-pressure tank 31 and the anode gas discharged from the anode of the fuel cell stack 1 through the anode gas circulation passage 35.

The anode gas circulation passage 35 is a passage for circulating the anode gas between the anode inlet port and the anode outlet port of the fuel cell stack 1.

The purge passage 36 is a passage for discharging the anode off-gas from the anode gas circulation passage 35. One end of the purge passage 36 is connected to the anode gas circulation passage 35, and the other end is connected to the cathode gas discharge passage 22. Alternatively, a buffer tank for temporarily storing the anode off-gas or the like may be provided in a coupling portion between the purge passage 36 and the anode gas circulation passage 35.

The hydrogen circulation pump 37 serves as a power source for circulating the anode gas inside the anode gas circulation passage 35.

The purge valve 38 is provided in the purge passage 36. The open/close operation of the purge valve 38 is controlled by the controller 6 to adjust a purge flow rate of the anode off-gas discharged from the anode gas circulation passage 35 to the cathode gas discharge passage 22.

When a purge control is performed such that the purge valve 38 has an open state, the anode off-gas is discharged to the outside through the purge passage 36 and the cathode gas discharge passage 22. In this case, the anode off-gas is mixed with the cathode off-gas in the cathode gas discharge passage 22. In this manner, by discharging the anode off-gas and the cathode off-gas to the outside in the mixed state, an anode gas concentration (hydrogen concentration) of the gas mixture is set to be equal to or lower than a discharge allowance concentration.

The power system 4 includes a drive motor 53, an inverter 54, a battery 55, a DC/DC converter 56, and auxiliary machinery 57.

The drive motor 53 is a three-phase AC synchronous motor and serves as a drive source for driving vehicle wheels. The drive motor 53 has an electric motor function for receiving power from the fuel cell stack 1 and the battery 55 and driving rotation and an electric generator function for generating electricity while being rotated and driven by an external force.

The inverter 54 includes a plurality of semiconductor switches such as an insulated gate bipolar transistor (IGBT). The switching of the semiconductor switch of the inverter 54 is controlled by the controller 6 so that DC power is converted into AC power, or AC power is converted into DC power. When the drive motor 53 serves as an electric motor, the inverter 54 converts synthesized DC power of the output power of the fuel cell stack 1 and the output power of the battery 55 into three-phase AC power and supplies it to the drive motor 53. In comparison, when the drive motor 53 serves as an electric generator, the inverter 54 converts regenerative power (three-phase AC power) of the drive motor 53 into DC power and supplies it to the battery 55.

The battery 55 is configured to charge the remaining output power of the fuel cell stack 1 and the regenerative power of the drive motor 53. The power charged in the battery 55 is supplied to the auxiliary machinery such as the cathode compressor 25 or the drive motor 53 as necessary.

The DC/DC converter 56 is a bidirectional voltage converter for boosting or dropping the output voltage of the fuel cell stack 1. The output current of the fuel cell stack 1 or the like is adjusted by controlling the output voltage of the fuel cell stack 1 using the DC/DC converter 56.

The auxiliary machinery 57 includes devices consuming the output power of the fuel cell stack 1 or the power of the battery 55, such as the cathode compressor 25, the cathode pressure control valve 28, the anode pressure control valve 33, and the purge valve 38.

The impedance measurement device 5 is a device for measuring an internal impedance Z of the fuel cell stack 1 on the basis of the output voltage and the output current of the fuel cell stack 1. Specifically, the impedance measurement device 5 controls the output power of the fuel cell stack 1 such that the output current and the output voltage of the fuel cell stack 1 contain an AC signal having a predetermined frequency, and calculates the internal impedance Z on the basis of the output voltage value and the output current value detected at this time. In addition, the impedance measurement device 5 outputs the measured internal impedance Z to the controller 6.

The controller 6 is a microcomputer provided with a central processing unit (CPU), a read-only memory (ROM), a random access memory (RAM), and input/output interface (I/O interface). The controller 6 receives signals from sensors such as an accelerator stroke sensor that detects a depression level of an accelerator pedal (not shown) in addition to signals from various sensors such as a current sensor or a voltage sensor (not shown).

The controller 6 controls an opening degree of the anode pressure control valve 33, an opening degree of the cathode pressure control valve 28, and the output power of the cathode compressor 25, and the like depending on an operation state of the fuel cell system 100 in order to regulate a pressure or a flow rate of the anode gas or the cathode gas supplied to the fuel cell stack 1.

The controller 6 calculates target output power on the basis of necessary power of the drive motor 53, necessary power of the auxiliary machinery 57, a charge/discharge request for the battery 55, or the like. The controller 6 calculates a target output current of the fuel cell stack 1 with reference to an I-V characteristic (current-voltage characteristic) of the fuel cell stack 1 set in advance on the basis of the target output power. In addition, the controller 6 controls the output voltage of the fuel cell stack 1 using the DC/DC converter 56 such that the output current of the fuel cell stack 1 reaches the target output current in order to supply the current necessary in the drive motor 53 or the auxiliary machinery.

In the fuel cell system 100 described above, according to this embodiment, the impedance measurement device 5 and the controller 6 serve as a device for determining a state of the fuel cell stack 1. In addition, in this embodiment, a method of detecting an oxygen deficiency state of the cathode as an internal state of the fuel cell stack 1 will be described.

Here, in the prior art, the oxygen deficiency state of the fuel cell stack 1 is determined by detecting an increase of the internal impedance value. In the prior art, it was conceived that the internal impedance value increases as the cathode reaction resistance included in the internal impedance increases by focusing on the fact that, typically, the reactions of the aforementioned formulas (1) and (2) in the fuel cell stack 1 is delayed as the oxygen deficiency state progresses.

However, the inventors found that, in practice, the cathode reaction resistance does not necessarily increase even when the fuel cell stack 1 has an oxygen deficiency state. Therefore, in this understanding of the inventors, it is difficult to determine that the fuel cell stack 1 has the oxygen deficiency state even when an increase of the internal impedance is detected.

In the following description, a theory of the relationship between the oxygen deficiency state and the cathode reaction resistance considered by the inventors will be described. However, this embodiment is not necessarily restricted to the theory described below.

Figure 2:
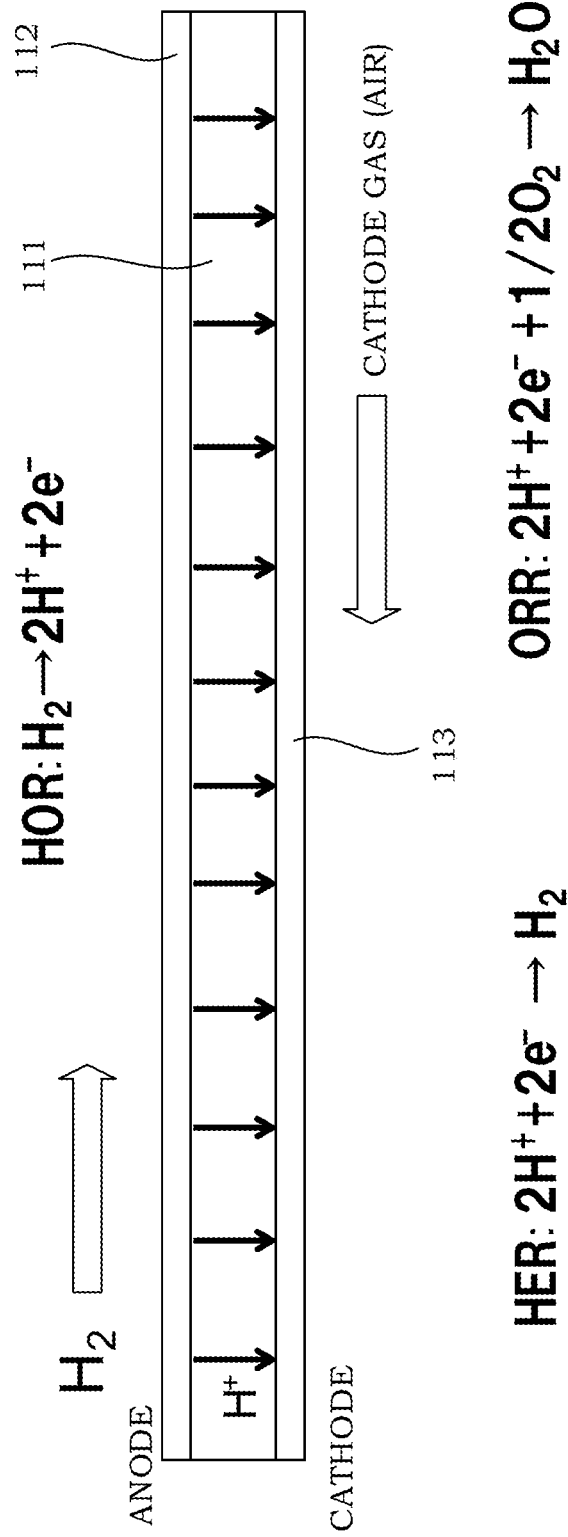
FIG. 2 is a diagram illustrating a principle of reaction in a fuel cell stack in an oxygen deficiency state.

FIG. 2 is a diagram illustrating a principle of the reaction inside the fuel cell stack 1 having the oxygen deficiency state. Note that FIG. 2 schematically illustrates a single fuel cell of the fuel cell stack 1.

In the fuel cell of FIG. 2, hydrogen as the anode gas flows along an anode 112, while the air as the cathode gas flows along a cathode 113. Here, the reaction of the formula (1) progresses in the anode 112 side during the fuel cell generation state, so that hydrogen oxidation reaction occurs to generate protons ($H^+$) and electrons ($e^-$). In the following description, this hydrogen oxidation reaction will be abbreviated as "HOR."

The generated protons advances to the cathode 113 through the electrolyte membrane 111 to generate the reaction of the formula (2) (oxygen reduction reaction) between the proton and the oxygen and produce water. In the following description, this oxygen reduction reaction will be abbreviated as "ORR."

The reaction of the fuel cell progresses through the HER and the ORR. However, when the cathode 113 has an oxygen deficiency state, the protons become excessive even the ORR progresses. Therefore, in the oxygen deficiency state of the cathode 113, the ORR is generated in the inlet side of the cathode 113 (in the supply port side of the cathode gas), and oxygen atoms reacting with the protons become short in the outlet side of the cathode 113, so that a hydrogen evolution reaction ($2H^+ + 2e^- \rightarrow H_2$) in which protons react only with electrons occurs.

In the following description, this hydrogen evolution reaction will be abbreviated as "HER". In addition, a phenomenon in which protons generated in the hydrogen oxidation reaction (the reaction of the formula (1)) of the anode side are transmitted to the cathode 113 and are bonded only with electrons to generate hydrogen in this manner is called a "proton pump."

Here, the HER has activation energy higher than that of the ORR, but energy necessary for the reaction itself is low. Therefore, when a sufficient amount of oxygen exists in the cathode 113, the occurrence of the ORR becomes dominant, and the HER rarely occurs. However, once the oxygen deficiency progresses and exceeds a barrier of the activation energy that can cause the HER, the HER more likely occurs as compared with the ORR. Therefore, in the cathode 113, the HER progresses instead of the ORR, so that a phenomenon in which the reaction resistance of the cathode 113 is reduced occurs because the energy necessary for the reaction of the HER is low.

Figure 3:
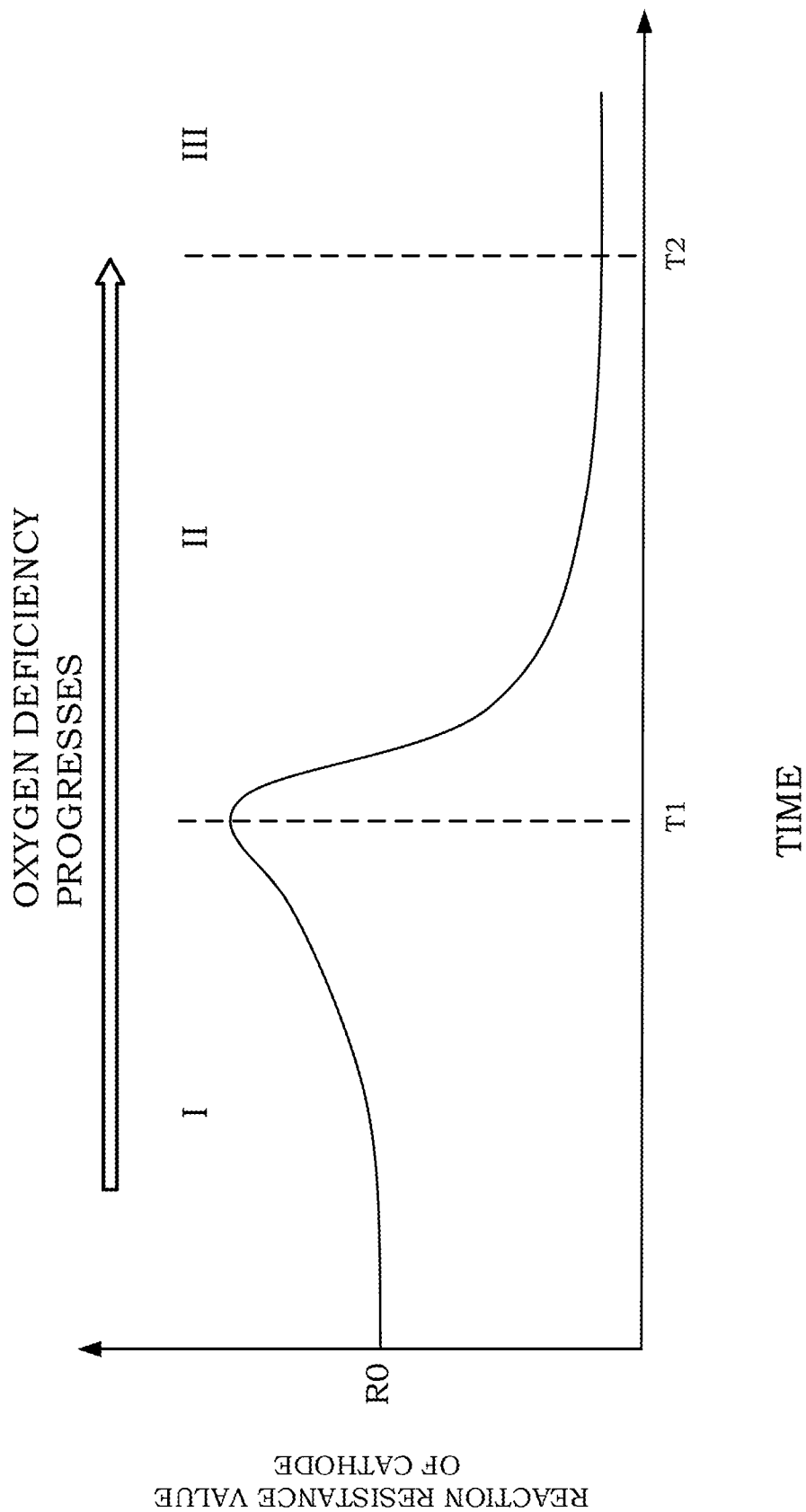
FIG. 3 is a diagram schematically illustrating time-series data representing a change of a reaction resistance value of a cathode against progression of oxygen deficiency.

FIG. 3 is a diagram schematically illustrating time-series data regarding a change of the reaction resistance value of the cathode 113 as the oxygen deficiency progresses. Here, in FIG. 3, the reaction resistance value of the cathode 113 is calculated on the basis of two frequencies selected from a specific frequency range described below and two internal impedances obtained at the two frequencies. In addition, in FIG. 3, a step of the oxygen deficiency progression is divided into an ORR step I, an ORR/HER step II, and a HER step III.

In the ORR step I, the oxygen deficiency of the cathode 113 starts, and the ORR of the cathode 113 wholly occurs. In this ORR step I, the reaction resistance value of the cathode 113 increases as the oxygen deficiency progresses. This is because the ORR becomes difficult to occur as the oxygen concentration decreases. This phenomenon has been known in the art as described above.

However, the inventors found that the reaction resistance value of the cathode 113 starts to decrease as the oxygen deficiency further progresses, and the reaction transits to the ORR/HER step II at the timing T1. It is conceived that this is because the HER starts to occur instead of the ORR as described above. Here, after the timing T1, the energy necessary in the HER reaction is lower than that of the ORR, and the oxygen atoms necessary in the ORR becomes shorter. Therefore, the occurrence of the HER further becomes dominant, so that the reaction resistance value of the cathode 113 is further reduced as the oxygen deficiency progresses.

If the oxygen deficiency further progresses, and the reaction transits to the HER step III at the timing T2, the ORR rarely occurs, and the HER wholly occurs. Therefore, the reaction resistance value of the cathode 113 gradually approaches a constant value smaller than the reaction resistance value RO before the oxygen deficiency starts (when the fuel cell does not have the oxygen deficiency state).

Therefore, paying attention to the HER occurring in the cathode 113, the inventors found that the reaction resistance value of the cathode 113 decreases as the oxygen deficiency progresses due to the occurrence of the HER, and conceived that this phenomenon could be used in determination of the oxygen deficiency state. In addition, the inventors also found that a decrease of the reaction resistance value of the cathode 113 caused by the occurrence of the HER described above is suitably detected by selecting the measurement frequency of the internal impedance used in calculation of the reaction resistance value from a specific frequency range. Furthermore, the inventors also found that a decrease of the reaction resistance value of the cathode 113 caused by the occurrence of the proton pump described above becomes particularly significant in the fuel cell stack 1 formed by stacking two or more fuel cells as described in this embodiment.

Figure 4:
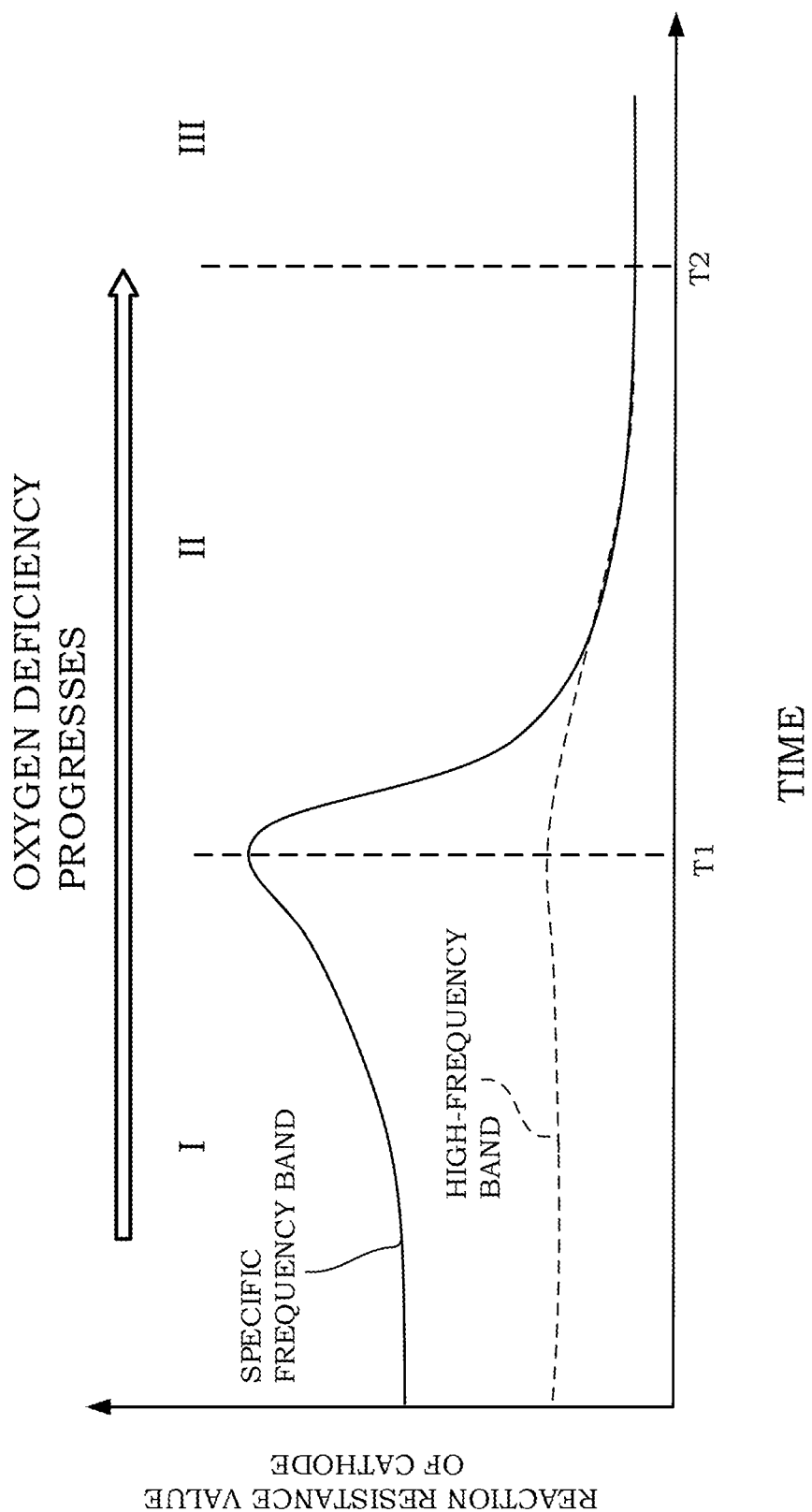
FIG. 4 is a diagram illustrating a relationship between a change of the reaction resistance value of the cathode against progression of the oxygen deficiency and a measurement frequency band of the internal impedance.

FIG. 4 is a diagram illustrating a relationship between a variation of the reaction resistance value of the cathode 113 and the measurement frequency band of the internal impedance as the oxygen deficiency progresses. In FIG. 4, a solid line indicates the reaction resistance value when the measurement frequency of the internal impedance is included in the aforementioned specific frequency band. In addition, in FIG. 4, a dotted line indicates the reaction resistance value when the measurement frequency of the internal impedance is higher than the specific frequency band.

As recognized from the solid line graph of FIG. 4, when the measurement frequency of the internal impedance is included in the specific frequency band, the reaction resistance value of the cathode 113 has a peak at the transition timing T1 from the ORR step I to the ORR/HER step II and decreases thereafter. That is, at the transition timing T1, the reaction resistance value of the cathode 113 starts to decrease due to influence of the HER.

Meanwhile, as recognized from the dotted line graph of FIG. 4, when a frequency in a high frequency band higher than the specific frequency band is set to be the measurement frequency of the internal impedance, the peak of the reaction resistance value of the cathode 113 is not apparent at the transition timing T1. That is, a decrease of the reaction resistance value of the cathode 113 influenced by the HER is not apparently detected.

Therefore, in order to detect the influence of the HER and determine the oxygen deficiency state, it is desirable to acquire the internal impedance at the frequency of the specific frequency band. This specific frequency band is determined on the basis of an experiment or the like, performed such that a difference between the reaction resistance value of the cathode 113 when the fuel cell stack 1 does not have an oxygen deficiency state (when the ORR wholly occurs) and the reaction resistance value of the cathode 113 when the fuel cell stack 1 has the oxygen deficiency state (when the HER wholly occurs) becomes a predetermined value or larger. Specifically, this specific frequency band is set to, for example, several hertz to several tens hertz, and particularly, 1 to 50 Hz.

In the following description a method of determining the oxygen deficiency state according to this embodiment will be described in details.

Figure 5:
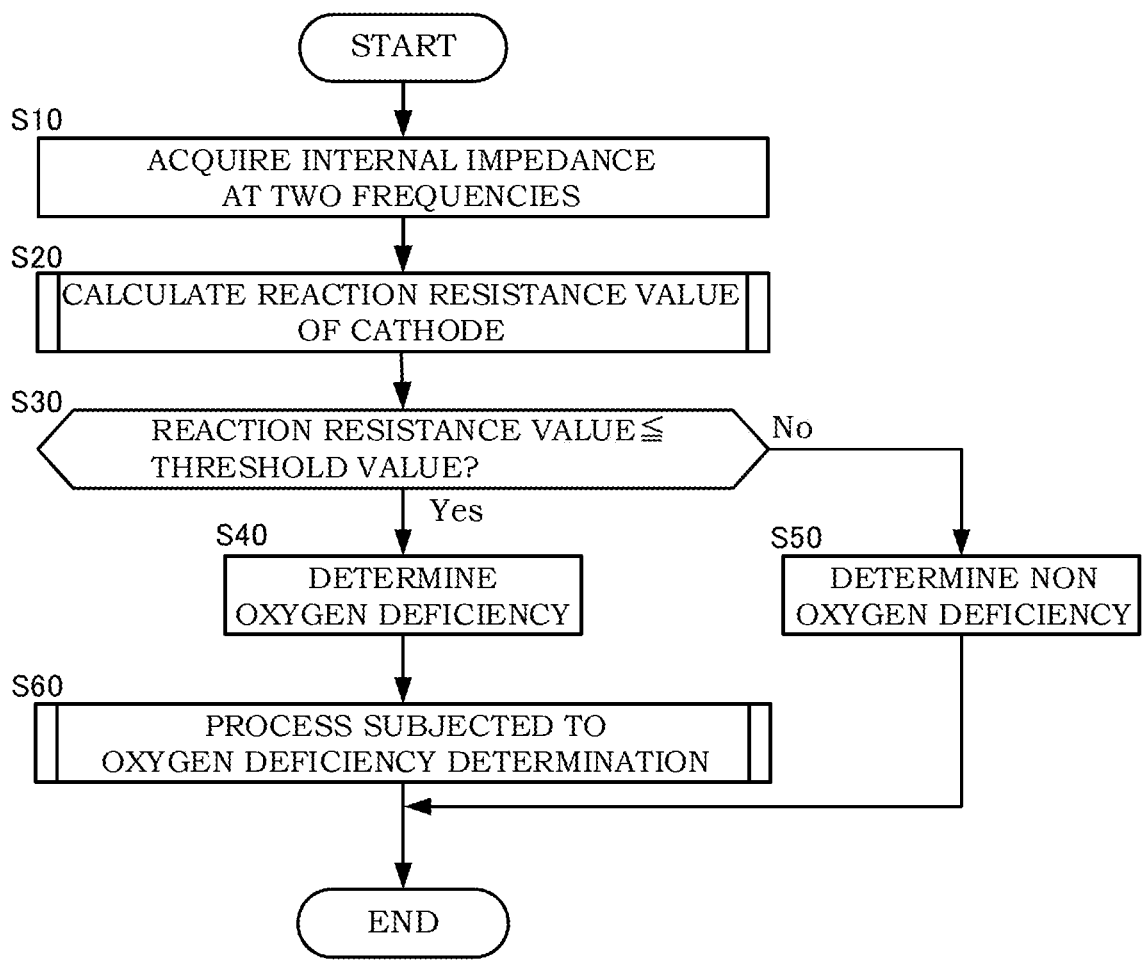
FIG. 5 is a flowchart illustrating a process flow for determining the oxygen deficiency state and operations subsequent to the determination according to an embodiment.

FIG. 5 is a flowchart illustrating a process flow for determining the oxygen deficiency state and operations subsequent to the determination according to this embodiment.

As illustrated in FIG. 5, in step S10, the controller 6 selects two frequencies $\omega 1$ and $\omega 2$ (where $\omega 1 < \omega 2$) from the specific frequency band and acquires the internal impedances $Z(\omega 1)$ and $Z(\omega 2)$ based on these frequencies $\omega 1$ and $\omega 2$. Specifically, first, the impedance measurement device 5 controls the DC/DC converter 56 such that the output current and the output voltage of the fuel cell stack 1 contain AC signals having frequencies $\omega 1$ and $\omega 2$, and measures the internal impedances $Z(\omega 1)$ and $Z(\omega 2)$ on the basis of the detected output current value and the detected output voltage value. In addition, the impedance measurement device 5 outputs the measured internal impedances $Z(\omega 1)$ and $Z(\omega 2)$ to the controller 6. Note that a method of selecting the frequencies $\omega 1$ and $\omega 2$ from the specific frequency band will be described below.

In step S20, the controller 6 calculates the reaction resistance value Ract,c of the cathode 113 on the basis of the frequencies $\omega 1$ and $\omega 2$ and the acquired internal impedances $Z(\omega 1)$ and $Z(\omega 2)$.

Figure 6:
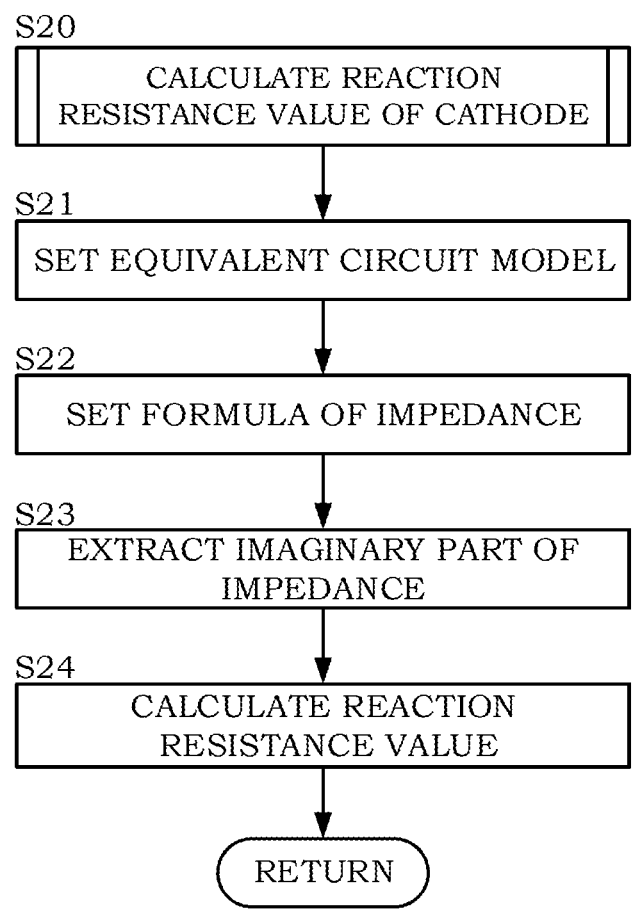
FIG. 6 is a flowchart illustrating a flow of calculating the reaction resistance value of the cathode according to an embodiment.

FIG. 6 is a flowchart illustrating a flow of calculating the reaction resistance value Ract,c of the cathode 113.

Figure 7A:
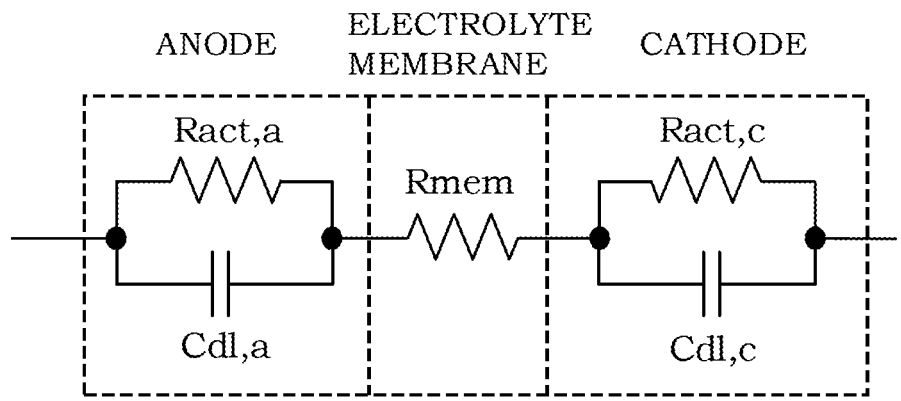
FIG. 7A is a diagram illustrating an exemplary equivalent circuit of the fuel cell stack.

In step S21, the controller 6 sets an equivalent circuit model of the fuel cell stack 1 illustrated in FIG. 7A. According to this embodiment, this equivalent circuit includes a reaction resistance value Ract,a of the anode 112, an electric bilayer capacitance value Cdl,a of the anode 112, a reaction resistance value Ract,c of the cathode 113, an electric bilayer capacitance value Cdl,c of the cathode 113, and an electrolyte membrane resistance value Rmem.

Here, the reaction resistance value Ract,a of the anode 112 changes depending on the reaction of the anode gas in the anode 112, and the reaction resistance value Ract,a increases, for example, when this reaction does not appropriately progress due to deficiency of the anode gas or the like. Therefore, while a sufficient amount of the anode gas is supplied to the anode 112, and hydrogen is not deficient, the reaction resistance value Ract,a of the anode 112 is smaller than the reaction resistance value Ract,c of the cathode 113. Therefore, the reaction resistance component of the anode 112 can be neglected.

The electric bilayer capacitance value Cdl,a of the anode 112 is obtained by modeling an electric capacitance of the anode of the fuel cell stack 1. Therefore, the electric bilayer capacitance value Cdl,a is determined on the basis of various factors such as a material or a size of the anode 112 or the like. Here, it is known that the electric bilayer capacitance value Cdl,a of the anode 112 has sensitivity at a low frequency (several hundreds hertz or lower) lower than that of the electric bilayer capacitance value Cdl,c of the cathode 113. In particular, at the frequency belonging to the specific frequency band assumed in this embodiment, the electric bilayer capacitance value Cdl,c insignificantly affects the internal impedance value. Therefore, the electric bilayer capacitance component of the anode 112 is negligible.

Figure 7B:
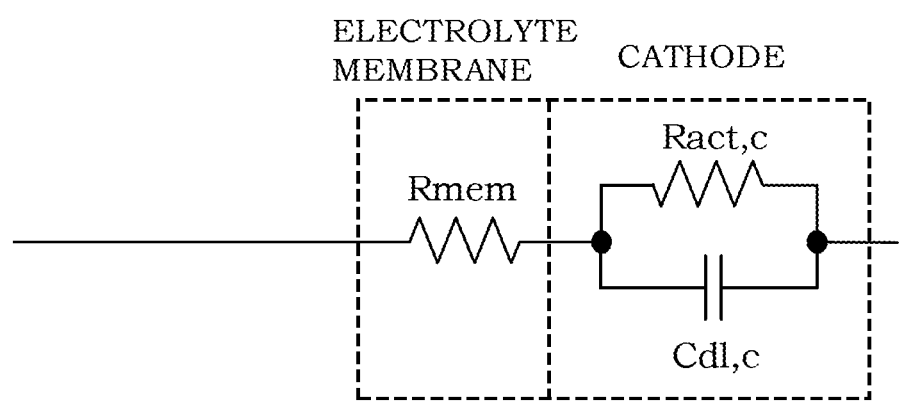
FIG. 7B is a diagram illustrating an exemplary equivalent circuit of the fuel cell stack.

In this manner, since the reaction resistance component of the anode 112 and the electric bilayer capacitance component of the anode 112 are negligible, the equivalent circuit model of the fuel cell stack 1 can be substantially considered as a circuit merely having the reaction resistance value Ract,c of the cathode 113, the electric bilayer capacitance value Cdl,c of the cathode 113, and the electrolyte membrane resistance value Rmem as illustrated in FIG. 7B.

Therefore, in the following description, for simplicity purposes, the reaction resistance value Ract,c of the cathode 113 will be simply referred to as "Ract," and the electric bilayer capacitance value Cdl,c of the cathode 113 will be simply referred to as "Cdl."

Returning to FIG. 6, in step S22, the controller 6 sets a formula for the internal impedance on the basis of the equivalent circuit of FIG. 7B. Therefore, the resulting internal impedance formula is established as:

[Formula 1]

$$Z = R_{mem} + \frac{R_{act}(1 - j\omega C_{dl} R_{act})}{1 + \omega^2 C_{dl}^2 R_{act}^2} \quad (3)$$

where "j" denotes an imaginary unit.

In step S23, the controller 6 extracts the imaginary part Zim of the aforementioned formula (3). The imaginary part Zim can be expressed as follows.

[Formula 2]

$$Z_{im} = \frac{-\omega C_{dl} R_{act}^2}{1 + \omega^2 C_{dl}^2 R_{act}^2} \quad (4)$$

In step S24, the controller 6 calculates the reaction resistance value Ract from the extracted imaginary part Zim of the internal impedance. Specifically, the frequencies ω1 and ω2 and the imaginary parts Zim(ω1) and Zim(ω2) of the internal impedances corresponding to these frequencies ω1 and ω2 are substituted to the aforementioned formula (4), and two equations having unknown factors Cdl and Ract are obtained, so that the reaction resistance value Ract is obtained by solving the two equations.

In particular, the formula (4) can be modified to the following formula (5).

[Formula 3]

$$-\frac{1}{\omega Z_{im}} = \frac{1}{\omega^2 C_{dl} R_{act}^2} + C_{dl} \quad (5)$$

Therefore, if a straight line is drawn by plotting two frequencies ω1 and ω2 and the imaginary parts Zim(ω1) and Zim(ω2) of the impedances on a coordinate plane having an ordinate set to "−1/ωZim" and an abscissa set to "1/ω2", and a slope and an intercept of this straight line are obtained, this slope becomes equal to "1/(Cdl·Ract²)" and the intercept becomes equal to "Cdl." As a result, it is possible to easily calculate the reaction resistance value Ract.

Returning to FIG. 5, in step S30, the controller 6 compares the reaction resistance value Ract of the cathode 113 calculated in step S20 and a predetermined determination threshold value Rth set in advance. That is, since the reaction resistance value Ract of the cathode 113 decreases due to occurrence of the HER when the oxygen deficiency progresses at a certain level or more as described above, it is possible to determine the oxygen deficiency state by comparing the reaction resistance value Ract and the predetermined determination threshold value Rth. Here, according to this embodiment, the determination threshold value Rth is set on the basis of a minimum value of the reaction resistance value Ract of the cathode 113 obtained by assuming that the fuel cell stack 1 does not have the oxygen deficiency state. In the following description, an exemplary method of setting this determination threshold value Rth will be described.

Figure 8:
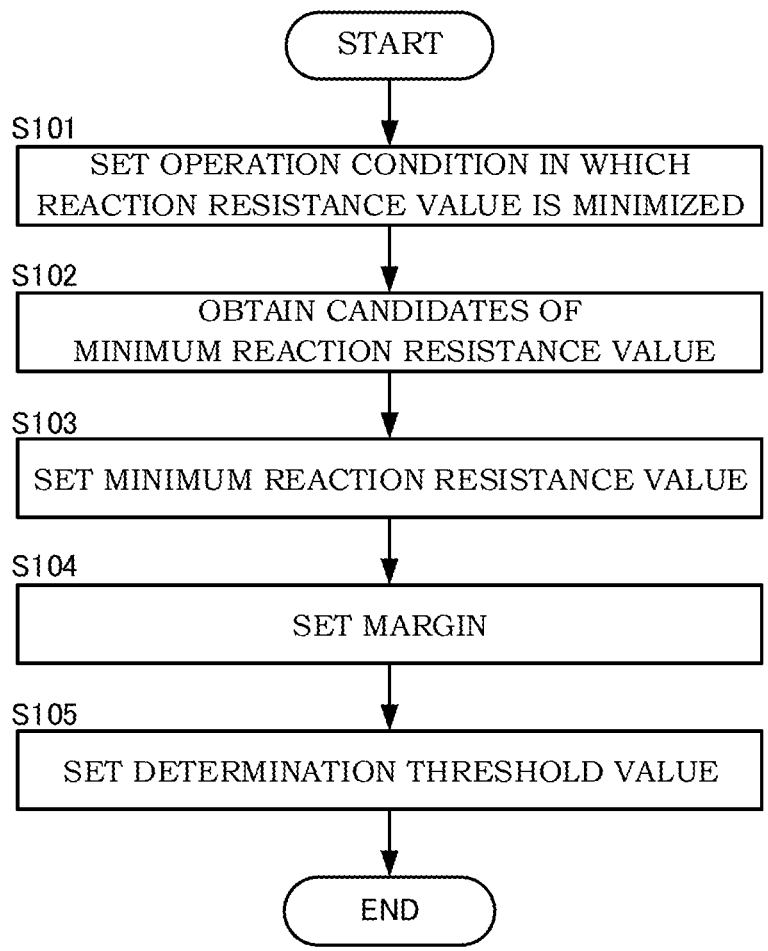
FIG. 8 is a flowchart illustrating a flow for setting a determination threshold value according to an embodiment.

FIG. 8 is a flowchart illustrating a flow for setting the determination threshold value Rth. Note that the setting of this determination threshold value Rth is performed before each process of the state determination method according to this embodiment.

As illustrated in FIG. 8, in step S101, the controller 6 sets an operation condition of the fuel cell stack 1 at which it is predicted that the reaction resistance value Ract of the cathode 113 is smallest while the fuel cell stack 1 does not have the oxygen deficiency state (while the ORR wholly occurs in the cathode 113). In the following description, a relationship between the reaction resistance value Ract of the cathode 113 and the operation condition of the fuel cell stack 1 will be described.

Figure 9A:
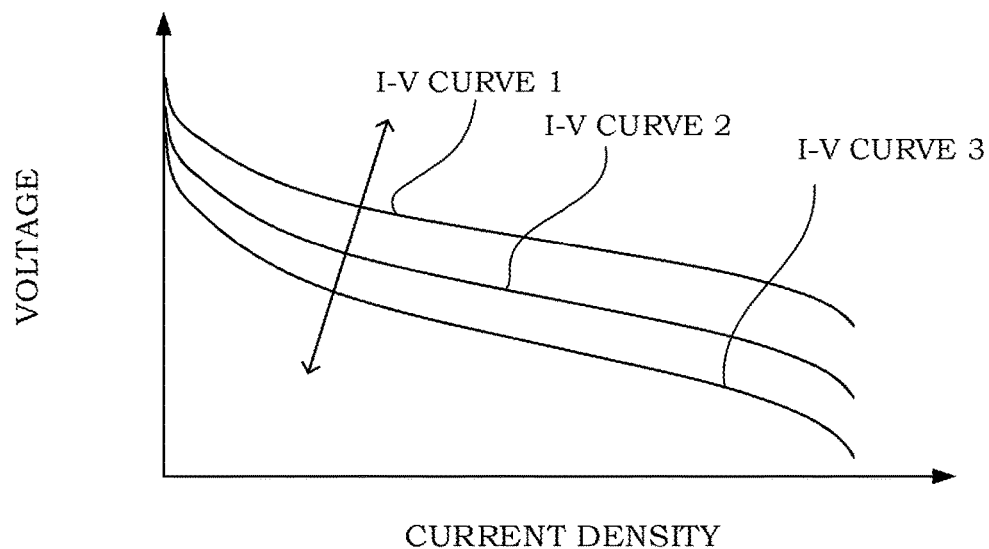
FIG. 9A is a diagram illustrating a variation of an I-V characteristic of the fuel cell stack.

FIG. 9A is a diagram illustrating a variation of an I-V characteristic of the fuel cell stack 1. In FIG. 9A, an I-V curve 1, an I-V curve 2, and an I-V curve 3 are illustrated as examples of the I-V characteristic obtained by the fuel cell stack 1.

It is known that the I-V characteristic of the fuel cell stack 1 is determined depending on parameters such as a degree of wetness of the electrolyte membrane 111 that changes depending on the operation state, a stack temperature, a cathode gas pressure, a rotation number of the hydrogen circulation pump, and a flow rate of the air supplied to the stack. In FIG. 9A, three curves including the I-V curves 1, 2, and 3 are illustrated as examples of the I-V curve that changes depending on these parameters. Here, generation efficiency of the fuel cell stack 1 is determined by multiplication between the current and the voltage, that is, an area of a portion surrounded by the I-V curves and each axis. Therefore, in the example of FIG. 9A, it can be said that the generation efficiency is higher (the I-V characteristic is excellent) in order of the I-V curve 3, the I-V curve 2, and the I-V curve 1.

Figure 9B:
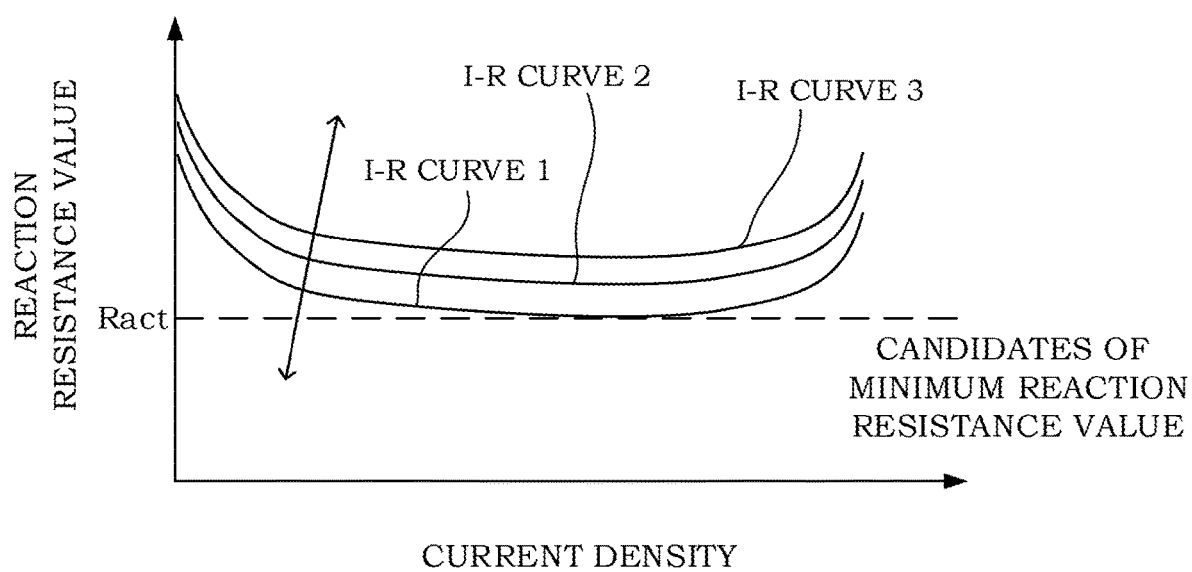
FIG. 9B is a diagram illustrating a relationship between a current density and the reaction resistance value depending on each I-V characteristic of the fuel cell stack.

Meanwhile, FIG. 9B is a diagram illustrating a relationship between a current density and the reaction resistance value Ract depending on each I-V characteristic of the fuel cell stack 1. In FIG. 9B, an I-R curve 1, an I-R curve 2, and an I-R curve 3 are illustrated to match the I-V curve 1, the I-V curve 2, and the I-V curve 3, respectively, to illustrate a relationship between the current density of the fuel cell stack 1 and the reaction resistance value Ract.

As illustrated in FIG. 9B, the I-R curve 1 corresponding to the I-V curve 1 having the best I-V characteristic takes the reaction resistance value Ract smaller than those of the I-R curve 2 and the I-R curve 3. That is, it is recognized that the reaction resistance value Ract is reduced as the fuel cell stack 1 has a better I-V characteristic. Therefore, in order to set the determination threshold value Rth, it is suitable to calculate a minimum value of the reaction resistance value Ract of the cathode 113 obtained by assuming that the fuel cell stack 1 does not have the oxygen deficiency state on the basis of the reaction resistance value Ract (I-R curve 1) under the operation condition having the best I-V characteristic.

Therefore, the controller 6 sets the operation condition of the fuel cell stack 1 such that the best I-V characteristic is obtained. Specifically, the I-V characteristic is controlled by adjusting the degree of wetness of the electrolyte membrane 111 to a predetermined value by adjusting the generation energy, by maintaining the temperature of the fuel cell stack 1 at an appropriate temperature, by adjusting the cathode gas pressure or the cathode gas flow rate, by adjusting the output power of the hydrogen circulation pump 37, or the like.

Returning to FIG. 8, in step S102, the controller 6 obtains candidates of the minimum reaction resistance value of the reaction resistance value Ract of the cathode 113. Specifically, under the operation condition of the I-V curve 1 that can obtain the I-R curve 1 described above, each of the internal impedances $Z(\omega k)$ and $Z(\omega l)$ is acquired using an arbitrary set of frequencies ($\omega k$, $\omega l$). In this case, the factor "k" and "l" denote any natural numbers.

The reaction resistance value Ract($\omega k$, $\omega l$) is calculated using a method similar to that described in step S20 on the basis of each of the acquired internal impedances $Z(\omega k)$ and $Z(\omega l)$. Each reaction resistance value Ract($\omega k$, $\omega l$) calculated in this manner becomes the candidate of the minimum reaction resistance value Rim.

In step S103, the minimum reaction resistance value Rim as the smallest value is extracted from each candidate of the minimum reaction resistance value Ract($\omega k$, $\omega l$) obtained in step S102. The minimum reaction resistance value Rlm extracted in this manner becomes the smallest value that the reaction resistance value Ract of the cathode 113 likely reaches in theory while the oxygen deficiency does not progress, that is, while the ORR wholly occurs in the cathode 113.

In step S104, the controller 6 calculates a margin ΔR from the minimum reaction resistance value Rlm. Here, the margin ΔR is set by assuming a situation in which the reaction resistance value Ract of the cathode 113 is smaller than the minimum reaction resistance value Rim even when the fuel cell stack 1 does not have the oxygen deficiency state caused by a measurement error or the like or disturbance.

Note that it is assumed that an oxygen deficiency progression rate (a percentage of occurrence of the HER) to be determined as the oxygen deficiency state is different depending on the operation state of the fuel cell stack 1 such as a high-load operation, a low-load operation, and a warm-up operation. Therefore, the oxygen deficiency progression rate to be determined as the oxygen deficiency state may be adjusted by determining the magnitude of the margin ΔR depending on the operation state of the fuel cell stack 1.

In step S105, the controller 6 sets, as the determination threshold value Rth, a value obtained by subtracting the margin ΔR calculated in step S104 from the minimum reaction resistance value Rim calculated in step S103.

Returning to FIG. 5, if the reaction resistance value Ract is smaller than the determination threshold value Rth as a result of comparison between the reaction resistance value Ract and the determination threshold value Rth in step S30 described above, the controller 6 advances the process to step S40 and determines that the fuel cell stack 1 has the oxygen deficiency state. Note that, if it is determined that the reaction resistance value Ract is greater than the determination threshold value Rth, the controller 6 advances the process to step S50, determines that the fuel cell stack 1 does not have the oxygen deficiency state, and terminates the routine.

Figure 10:
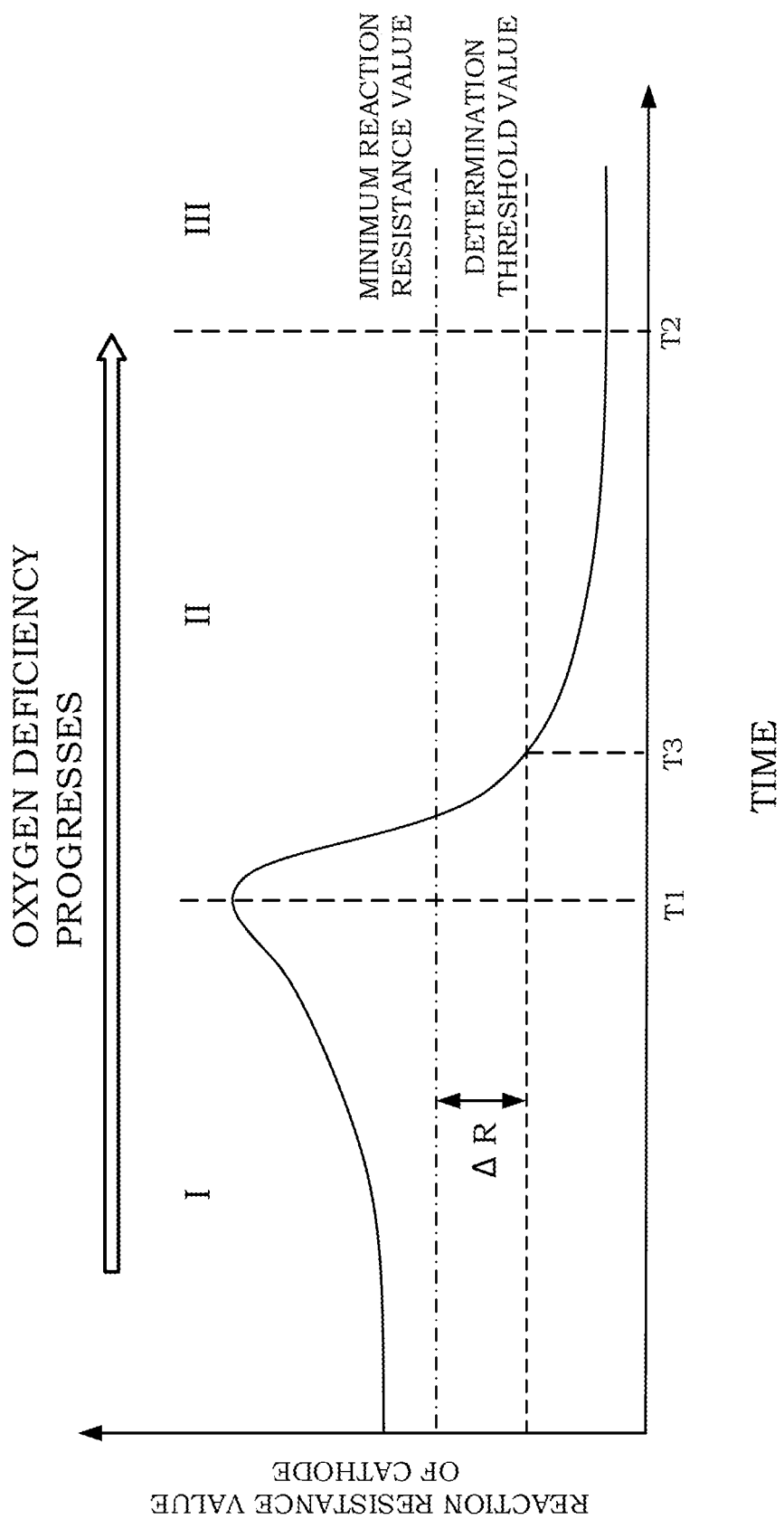
FIG. 10 is a graph illustrating a relationship between the reaction resistance value and the determination threshold value.

FIG. 10 is a graph illustrating a relationship between the reaction resistance value Ract and the determination threshold value Rth. In FIG. 10, the one-dotted chain line indicates the minimum reaction resistance value, and the dotted line indicates the determination threshold value Rth. As illustrated in FIG. 10, the determination threshold value Rth is smaller than the minimum reaction resistance value Rim, by the margin ΔR, assumed to be obtained in the ORR step I in which the ORR wholly occurs. Meanwhile, when the oxygen deficiency state progresses to a certain level, and the HER dominantly occurs in the cathode 113, so that the reaction resistance value Ract of the cathode 113 decreases below a certain level, the reaction resistance value Ract becomes smaller than the determination threshold value Rth at the timing T3 in FIG. 10. Therefore, according to this embodiment, the controller 6 determines that the fuel cell stack 1 has the oxygen deficiency state at the timing T3 in which the reaction resistance value Ract becomes equal to or smaller than the determination threshold value Rth.

Using the method described above in steps S10 to S50 of FIG. 5, it is possible to accurately determine the oxygen deficiency state of the fuel cell stack 1 and appropriately perform the subsequent process.

Note that, if it is determined that the fuel cell stack 1 has the oxygen deficiency state in step S40, the controller 6 performs the process subsequent to the oxygen deficiency determination in step S60. Specifically, in order to remove the oxygen deficiency state, a process of improving the output of the cathode compressor 25 or a process of reducing the output of the fuel cell stack 1 is performed, and the oxygen deficiency state is removed.

In the method of determining the state of the fuel cell stack 1 according to this embodiment, in order to determine the oxygen deficiency state with desirable accuracy, it is also important to determine which of frequencies $\omega 1$ and $\omega 2$ is selected from the specific frequency band as the frequency used in measurement of the internal impedance Z. Therefore, an exemplary method of selecting the employed frequencies $\omega 1$ and $\omega 2$ will be described below. Note that the selection of the employed frequencies $\omega 1$ and $\omega 2$ is executed before the oxygen deficiency state determination process of FIG. 5.

Figure 11:
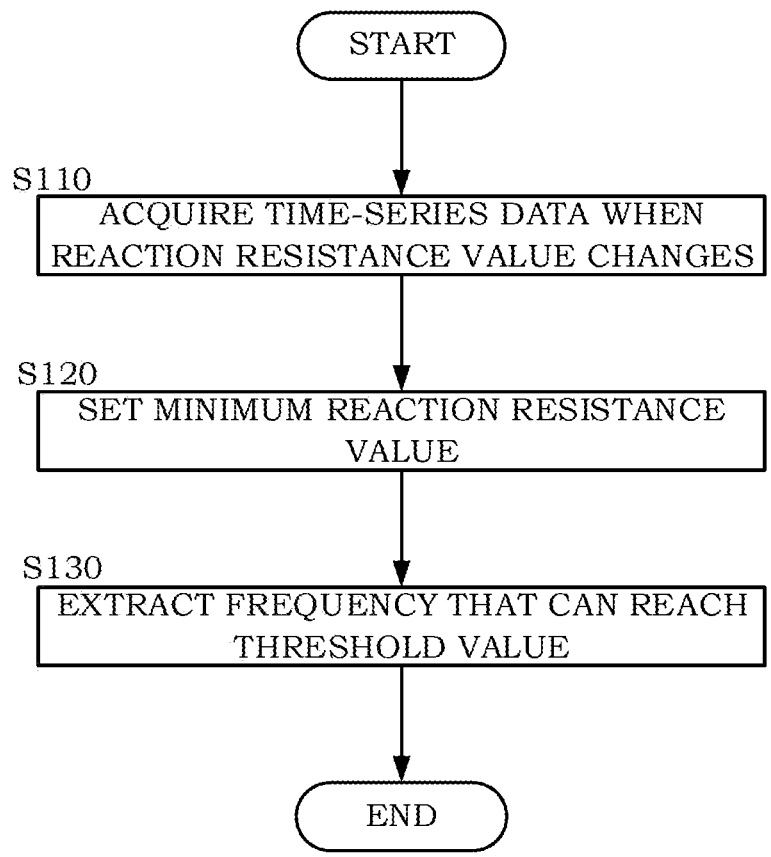
FIG. 11 is a flowchart illustrating a method of selecting a frequency.

FIG. 11 is a flowchart illustrating a method of selecting frequencies $\omega 1$ and $\omega 2$.

In step S110, the controller 6 acquires time-series data indicating a variation of the reaction resistance value Ract at each frequency as the oxygen deficiency state progresses. More specifically, first, the controller 6 controls the operation condition of the fuel cell stack 1 such that the aforementioned excellent I-V characteristic (the I-V curve 1 of FIG. 9A) is obtained. Then, while the oxygen deficiency progresses from this state, the controller 6 time-dependently calculates the reaction resistance value Ract for each of a plurality of frequencies (a plurality of frequency sets) belonging to the specific frequency band.

Specifically, first, a plurality of frequency sets ($\omega k$, $\omega 1$), each of which includes a pair of frequencies, are extracted from the specific frequency band. Note that, here, the factors "k" and "l" denote any natural numbers. In addition, each of the internal impedances $Z(\omega k)$ and $Z(\omega 1)$ is obtained on the basis of each of the frequency sets ($\omega k$, $\omega 1$), and each of the reaction resistance values Ract($\omega k$, $\omega 1$) is calculated using the method similar to that described above in step S20 on the basis of each of the obtained internal impedances $Z(\omega k)$ and $Z(\omega 1)$.

It is possible to obtain the frequency-based time-series data of the reaction resistance value Ract($\omega k$, $\omega 1$) by repeating the calculation of the reaction resistance value Ract($\omega k$, $\omega 1$) at every predetermined cycle. Note that the time-series data of the reaction resistance value Ract($\omega k$, $\omega 1$) is different depending on magnitudes of the frequencies $\omega k$ and $\omega 1$ as described above in conjunction with FIG. 4. In addition, the predetermined cycle for this calculation also depends on the magnitudes of the frequencies $\omega k$ and $\omega 1$. That is, the cycle necessary in the calculation can be reduced by setting the extracted frequencies $\omega k$ and $\omega 1$ to be higher.

In step S120, the controller 6 calculates a minimum value Rmin($\omega k$, $\omega 1$) for each frequency from the frequency-based time-series data of the reaction resistance value Ract($\omega k$, $\omega 1$) obtained in step S110.

In step S130, the controller 6 extracts a frequency set ($\omega 1$, $\omega 2$) having the highest frequency $\omega 2$ at which the minimum value Rmin($\omega k$, $\omega 1$) can reach the determination threshold value Rth set in step S105 out of a plurality of frequency sets ($\omega k$, $\omega 1$) extracted in step S120.

That is, it is conceived that, if a frequency set having an excessively high frequency is extracted, the reaction resistance value Ract($\omega k$, $\omega 1$) is not smaller than the determination threshold value Rth($\omega k$, $\omega 1$), and determination of the oxygen deficiency is not sufficiently performed even when the oxygen deficiency progresses. In comparison, it is conceived that, if a frequency sets having an excessively low frequency is extracted, the cycle at which the reaction resistance value Ract($\omega k$, $\omega 1$) can be calculated increases, and the calculation accuracy is degraded. Therefore, according to this embodiment, the frequency is selected such that the reaction resistance value Ract($\omega k$, $\omega 1$) can reach the determination threshold value Rth($\omega k$, $\omega 1$), and the calculation accuracy can be appropriately secured in this manner.

In addition, as the frequency $\omega 1$, any frequency lower than the frequency $\omega 2$ may be selected out of the frequencies included in the specific frequency band. However, in order to prevent a measurement error, the frequency $\omega 1$ is preferably set to a value as far as possible from the frequency $\omega 2$. For example, the lowest frequency out of the specific frequency band is preferably selected as the frequency $\omega 1$.

Using the fuel cell state determination method according to this embodiment described hereinbefore, it is possible to obtain the following effects. Note that all of calculation, determination or the like processes described below are executed by the controller 6.

According to this embodiment, there is provided a fuel cell state determination method in which an internal state of the fuel cell stack 1 which is a fuel cell supplied with the anode gas and the cathode gas to generate electricity. In addition, in this fuel cell state determination method, a decrease of the reaction resistance value Ract of the cathode 113 caused by the hydrogen evolution reaction (HER) generated in the cathode 113 depending on the oxygen deficiency state of the fuel cell stack 1 is detected, and the oxygen deficiency state of the cathode 113 is determined on the basis of detection of the decrease of the reaction resistance value Ract.

According to this embodiment, in particular, the impedance measurement device 5 and the controller 6 constitute the reaction resistance value decrease detection unit configured to detect a decrease of the reaction resistance value Ract of the cathode 113 caused by the hydrogen evolution reaction (HER) generated in the cathode 113 depending on the oxygen deficiency state of the fuel cell stack 1. In addition, the controller 6 serves as an oxygen deficiency state determination configured to determine the oxygen deficiency state of the cathode 113 on the basis of detection of the decrease of the reaction resistance value Ract when the calculated reaction resistance value is equal to or smaller than a predetermined threshold value.

In this manner, this embodiment provides a novel idea for detecting the oxygen deficiency state by detecting a decrease of the reaction resistance value Ract of the cathode 113 (refer to FIG. 3 or the like) caused by the HER by focusing on a fact that the HER occurs depending on the oxygen deficiency state of the fuel cell stack 1. As a result, compared to the method of the prior art in which the oxygen deficiency is detected on the basis of an increase of the internal impedance, it is possible to provide a method of more preferably determining the oxygen deficiency state of the fuel cell stack 1.

In the fuel cell state determination method according to this embodiment, the reaction resistance value decrease detection unit described above acquires the internal impedances $Z(\omega 1)$ and $Z(\omega 2)$ of the fuel cell stack 1 on the basis of two frequencies $\omega 1$ and $\omega 2$ belonging to a predetermined frequency band and calculates the reaction resistance value Ract of the cathode 113 on the basis of the acquired internal impedances $Z(\omega 1)$ and $Z(\omega 2)$. In addition, the oxygen deficiency state determination unit of the controller 6 determines that the fuel cell stack 1 has the oxygen deficiency state when the calculated reaction resistance value Ract is equal to or smaller than a predetermined threshold value Rth. Furthermore, the predetermined frequency band is a specific frequency band in which a difference between the reaction resistance value Ract of the cathode 113 during occurrence of the HER and the reaction resistance value Ract of the cathode 113 during no occurrence of the HER is equal to or larger than a predetermined value.

That is, the frequencies $\omega 1$ and $\omega 2$ are selected from the specific frequency band in which a difference between the reaction resistance value Ract calculated on the basis of the internal impedances $Z(\omega 1)$ and $Z(\omega 2)$ measured during occurrence of the HER and the reaction resistance value Ract calculated on the basis of the internal impedances $Z(\omega 1)$ and $Z(\omega 2)$ measured during no occurrence of the HER becomes equal to or larger than a predetermined value. Since the internal impedances $Z(\omega 1)$ and $Z(\omega 2)$ are acquired at the frequencies $\omega 1$ and $\omega 2$ selected from this specific frequency band, information of the HER occurrence state in which oxygen deficiency progresses and information of the HER non-occurrence state in which oxygen deficiency does not progress are clearly indicated in the reaction resistance value Ract of the cathode 113. Therefore, it is possible to more accurately determine a decrease of the reaction resistance value Ract of the cathode 113 and improve determination accuracy of the oxygen deficiency state as a result.

In particular, the inventors made diligent efforts in studies and found that the reaction resistance value Ract of the cathode 113 is significantly reduced in the HER occurrence state, compared to the HER non-occurrence state (in which the ORR wholly occurs). Therefore, since it is possible to clearly determine a decrease of the reaction resistance value Ract of the cathode 113, it is possible to determine the oxygen deficiency state with high accuracy.

For example, when a factor affecting the reaction resistance value Ract, such as drying of the electrolyte membrane 111 or hydrogen deficiency in the anode 112, occurs, this may hinder an electrochemical reaction in the fuel cell stack 1 as expressed in the formula (1) or (2). Therefore, typically, the reaction resistance value Ract tends to increase. However, according to this embodiment, reversely, the oxygen deficiency state of the fuel cell stack 1 is determined on the basis of a decrease of the reaction resistance value Ract of the cathode 113. Therefore, it is possible to determine the oxygen deficiency state clearly distinguishably from other factors such as drying of the electrolyte membrane 111 or hydrogen deficiency in the anode 112.

Note that the number of frequencies selected from the specific frequency band is not limited to "two". Alternatively, three or more frequencies may be selected from the specific frequency band, and the internal impedance may be obtained for each frequency, so that the acquired three or more internal impedances can be used to calculate the reaction resistance value Ract of the cathode 113.

In the fuel cell state determination method according to this embodiment, the reaction resistance value decrease detection unit described above sets the determination threshold value Rth which is a predetermined threshold value on the basis of the minimum reaction resistance value Rlm which is the minimum value of the reaction resistance value Ract of the cathode 113 obtained by assuming that the fuel cell stack 1 does not have the oxygen deficiency state.

Using the determination threshold value Rth set in this manner, it is possible to more accurately determine the oxygen deficiency state of the fuel cell stack 1.

In the fuel cell state determination method according to this embodiment, the reaction resistance value decrease detection unit sets the minimum reaction resistance value Rim considering the I-V characteristic of the fuel cell stack 1. As a result, for example, by obtaining the minimum reaction resistance value Rim under the I-V characteristic having high efficiency (excellent I-V characteristic) in which it is considered that the reaction resistance value Ract of the cathode 113 is relatively reduced, it is possible to obtain the minimum reaction resistance value Rim which less likely decreases when the fuel cell stack 1 does not have the oxygen deficiency state. Therefore, it is possible to more accurately determine the oxygen deficiency state of the fuel cell stack 1.

Alternatively, for example, when it is necessary to more safely determine the oxygen deficiency state, the minimum reaction resistance value Rim may be obtained under the I-V characteristic of the fuel cell stack 1 having relatively low efficiency.

In the fuel cell state determination method according to this embodiment, the reaction resistance value decrease detection unit calculates the reaction resistance value Ract of the cathode 113 on the basis of each of the imaginary parts $Zim(\omega1)$ and $Zim(\omega2)$ of the internal impedances $Z(\omega1)$ and $Z(\omega2)$.

As a result, it is not necessary to use the real part of the internal impedance in calculation of the reaction resistance value Ract. Therefore, it is possible to facilitate calculation of the reaction resistance value Ract. In addition, it is possible to exclude influence of disturbance such as a variation of resistance of a member that may be likely included in the real part of the internal impedance.

In the fuel cell state determination method according to this embodiment, the reaction resistance value Ract of the cathode 113 is calculated on the basis of two or more formulas obtained by substituting the frequencies $\omega1$ and $\omega2$ and each of the imaginary parts $Zim(\omega1)$ and $Zim(\omega2)$ of the internal impedances obtained at the frequencies $\omega1$ and $\omega2$ to the aforementioned formula (4).

As a result, it is possible to calculate the reaction resistance value Ract of the cathode 113 through simple calculation depending on the equivalent circuit of the fuel cell stack 1 of FIG. 7B.

Second Embodiment

A second embodiment will now be described. In each embodiment described below, like reference numerals denote like elements as in the first embodiment described above, and they will not be described repeatedly as appropriate.

According to this embodiment, in particular, in order to calculate the Ract of the cathode 113, real parts $Zre(\omega1)$ and $Zre(\omega2)$ of the internal impedances and a resistance value Rmem of the electrolyte membrane 111 (hereinafter, referred to as an electrolyte membrane resistance value Rmem) are employed instead of using the imaginary parts $Zim(\omega1)$ and $Zim(\omega2)$ of the internal impedances in the first embodiment.

Figure 12:
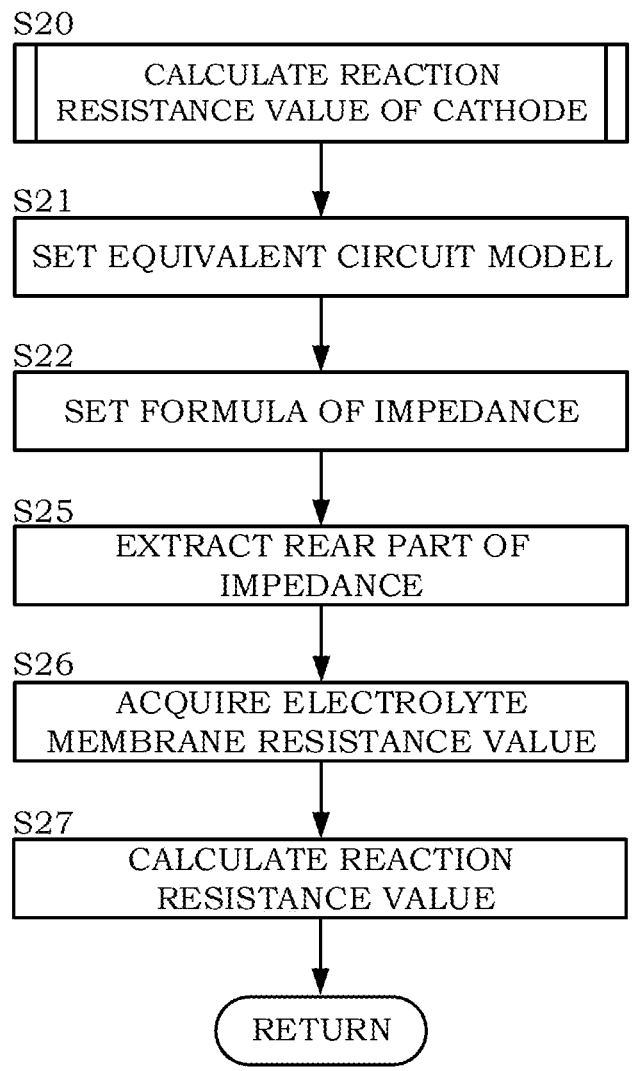
FIG. 12 is a flowchart illustrating a process flow for determining the oxygen deficiency state and operations subsequent to the determination according to an embodiment.

FIG. 12 is a flowchart illustrating a process flow for determining the oxygen deficiency state and operations subsequent to the determination according to an embodiment. Note that steps S20 to S22 are similar to those of the first embodiment.

In step S25, the controller 6 extracts a real part Zre of the aforementioned formula (3). The real part Zre can be expressed as follows.

[Formula 4]

$$Z_{re} = R_{mem} + \frac{R_{act}}{1 + \omega^2 C_{dl}^2 R_{act}^2} \tag{6}$$

In step S26, the controller 6 acquires the electrolyte membrane resistance value Rmem. Specifically, the impedance measurement device 5 controls the DC/DC converter 56 such that the output current and the output voltage of the fuel cell stack 1 contain an AC signal of a sufficiently high frequency $\omega\infty$ over several kilohertz, and calculates the internal impedance $Z(\omega\infty)$ as the electrolyte membrane resistance value Rmem on the basis of the detected output current value and the detected output voltage value. In addition, the impedance measurement device 5 outputs the electrolyte membrane resistance value Rmem to the controller 6.

In step S27, the controller 6 calculates the reaction resistance value Ract from the extracted imaginary part Zre of the internal impedance and the calculated electrolyte membrane resistance value Rmem. The controller 6 substitutes the frequencies $\omega1$ and $\omega2$, the real parts $Zre(\omega1)$ and $Zre(\omega2)$ of each internal impedance obtained at these frequencies, and the acquired electrolyte membrane resistance value Rmem to the aforementioned formula (6), obtains two equations having unknown factors Cdl and Ract, and solves the equations to obtain the reaction resistance value Ract.

In particular, the aforementioned formula (6) can be modified to the following formula (7).

[Formula 5]

$$\frac{1}{Z_{re} - R_{mem}} = \omega^2 C_{dl}^2 R_{act} + \frac{1}{R_{act}} \quad (7)$$

Therefore, when a straight line is drawn by plotting two frequencies ω1 and ω2 and the real parts Zre(ω1) and Zre(ω2) of the impedances on a coordinate plane having an ordinate set to "−1/Zre-Rmem" and an abscissa set to "ω²", and a slope and an intercept of this straight line are obtained, this slope becomes equal to "Cd1²·Ract", and the intercept becomes equal to "1/Ract". As a result, it is possible to easily calculate the reaction resistance value Ract.

Using the fuel cell state determination method according to this embodiment described above, it is possible to obtain the following effects. Note that all of the processes such as calculation or determination described below are executed by the controller 6.

In the fuel cell state determination method according to this embodiment, the reaction resistance value decrease detection unit including the impedance measurement device 5 and the controller 6 calculates the electrolyte membrane resistance value Rmem of the fuel cell stack 1 and calculates the reaction resistance value Ract of the cathode 113 on the basis of the electrolyte membrane resistance value Rmem and each of the real parts Zre(ω1) and Zre(ω2) of the internal impedances.

As a result, it is possible to facilitate calculation of the reaction resistance value Ract because it is not necessary to use the imaginary part of the internal impedance in calculation of the reaction resistance value Ract.

In the fuel cell state determination method according to this embodiment, the reaction resistance value Ract of the cathode 113 is calculated on the basis of the two or more formulas obtained by substituting two frequencies ω1 and ω2, Zre(ω1) and Zre(ω2) of the internal impedances acquired at the two frequencies ω1 and ω2, and the electrolyte membrane resistance value Rmem to the aforementioned formula (6).

As a result, it is possible to calculate the reaction resistance value Ract of the cathode 113 through simple calculation depending on the equivalent circuit of the fuel cell stack 1 of FIG. 7B.

Third Embodiment

A third embodiment will now be described. According to this embodiment, in particular, when the reaction resistance value Ract of the cathode 113 is calculated, the reaction resistance value Ract of the cathode 113 is calculated on the basis of both the real part Zre and the imaginary part Zim of the internal impedance.

Figure 13:
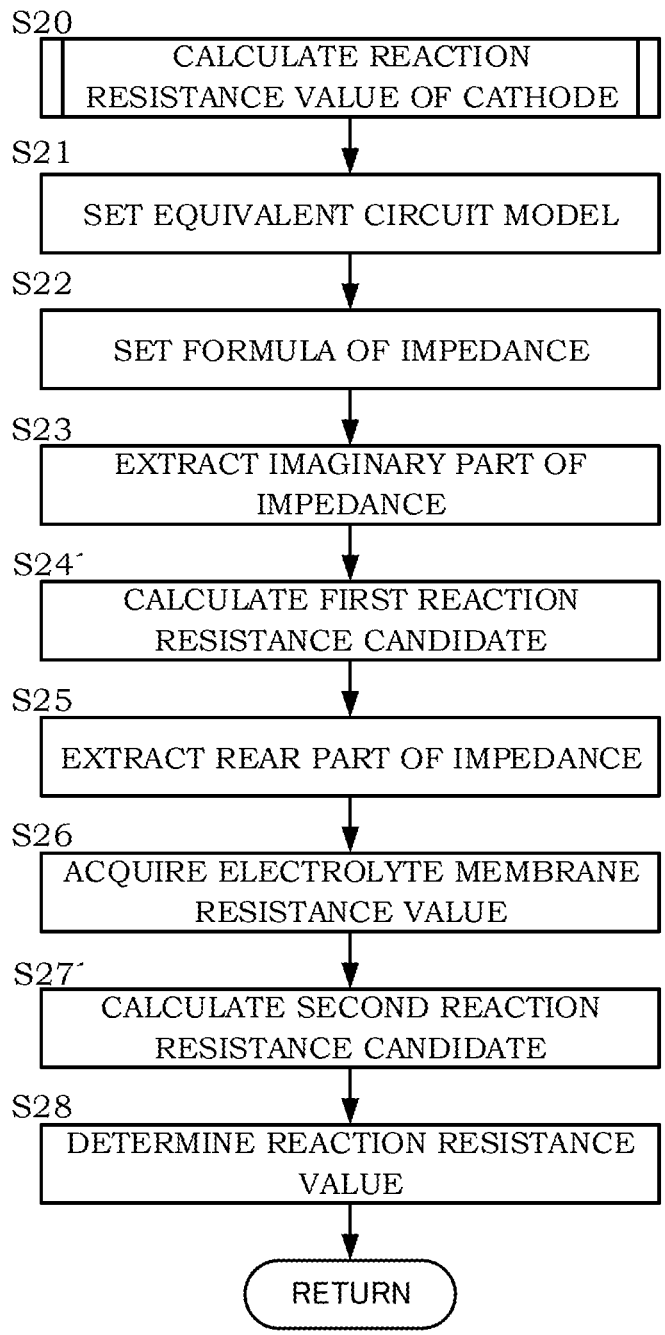
FIG. 13 is a flowchart illustrating a process flow for determining the oxygen deficiency state and operations subsequent to the determination according to an embodiment.

FIG. 13 is a flowchart illustrating a process flow for determining the oxygen deficiency state and operations subsequent to the determination according to this embodiment.

As illustrated in FIG. 13, steps S20 to S23 are executed similarly to the first embodiment. In addition, in step S24', the controller 6 calculates a first reaction resistance candidate Ract1 from the imaginary part Zim of the internal impedance extracted in step S23. A specific method of calculating the first reaction resistance candidate Ract1 is similar to the method of calculating the reaction resistance value Ract executed in step S24 of the first embodiment.

Then, steps S25 and S26 are executed similarly to the second embodiment. In addition, in step S27', a second reaction resistance candidate Ract2 is calculated on the basis of the extracted imaginary part Zre of the internal impedance and the calculated electrolyte membrane resistance value Rmem. A specific method of calculating the second reaction resistance candidate Ract2 is similar to the method of calculating the reaction resistance value Ract executed in step S27 of the second embodiment.

In step S28, the controller 6 determines the reaction resistance value Ract of the cathode 113. Specifically, the controller 6 determines the smaller one of the first reaction resistance candidate Ract 1 and the second reaction resistance candidate Ract2 as the reaction resistance value Ract of the cathode 113.

Using the fuel cell state determination method according to this embodiment described above, it is possible to obtain the following effects. Note that all of processes such as calculation or determination described below are executed by the controller 6.

In the fuel cell state determination method according to this embodiment, the reaction resistance value decrease detection unit including the impedance measurement device 5 and the controller 6 calculates the reaction resistance value Ract of the cathode 113 using both the real part Zre and the imaginary part Zim of the internal impedance Z. As a result, compared to a case where any one of the real part Zre and the imaginary part Zim is used, it is possible to provide diversity in the calculation mode of the reaction resistance value Ract depending on a situation, such as securing the accuracy of the calculated reaction resistance value Ract of the cathode 113 or setting more conservative values.

In the fuel cell state determination method according to this embodiment, the reaction resistance value decrease detection unit calculates each of the candidate values Ract1 and Ract2 of the reaction resistance value of the cathode on the basis of each of the real part Zre and the imaginary part Zim of the internal impedance Z, and determines the smaller one of the candidates Ract1 and Ract2 as the reaction resistance value Ract of the cathode 113.

As a result, even when a discrepancy occurs between the equivalent circuit model of the fuel cell stack 1 and an actual behavior of the fuel cell stack 1, or an error occurs in separation of the real part Zre and the imaginary part Zim from the internal impedance Z, it is possible to determine the oxygen deficiency more considering safety by using the reaction resistance value Ract as a conservative value.

Note that the method of calculating the reaction resistance value Ract of the cathode 113 using both the real part Zre and the imaginary part Zim of the internal impedance Z is not limited to that described in this embodiment. For example, although the smaller one of the first and second reaction resistance candidates Ract1 and Ract2 is determined as the reaction resistance value Ract of the cathode 113 in this embodiment, the larger one of the first and second reaction resistance candidates Ract1 and Ract2 may be determined as the reaction resistance value Ract of the cathode 113. As a result, it is possible to prevent frequent determination of the oxygen deficiency that may be generated when the reaction resistance value Ract of the cathode 113 is estimated to be higher than expectation.

Alternatively, an average of the first and second reaction resistance candidates Ract1 and Ract2 may be set as the reaction resistance value Ract of the cathode 113. As a result, it is possible to further improve accuracy of the calculated reaction resistance value Ract of the cathode 113.

Fourth Embodiment

A fourth embodiment will now be described. Note that like reference numerals denote like elements as in the aforementioned embodiments.

According to this embodiment, instead of a configuration in which the AC signal is overlapped between the output current I and the output voltage V in measurement of the impedance of the fuel cell stack 1, a so-called excited current applying method is performed by supplying the current I from a predetermined measurement current source to the fuel cell stack 1 and calculating the impedance Z=V/I on the basis of this supplied current I and the output voltage V.

Figure 14:
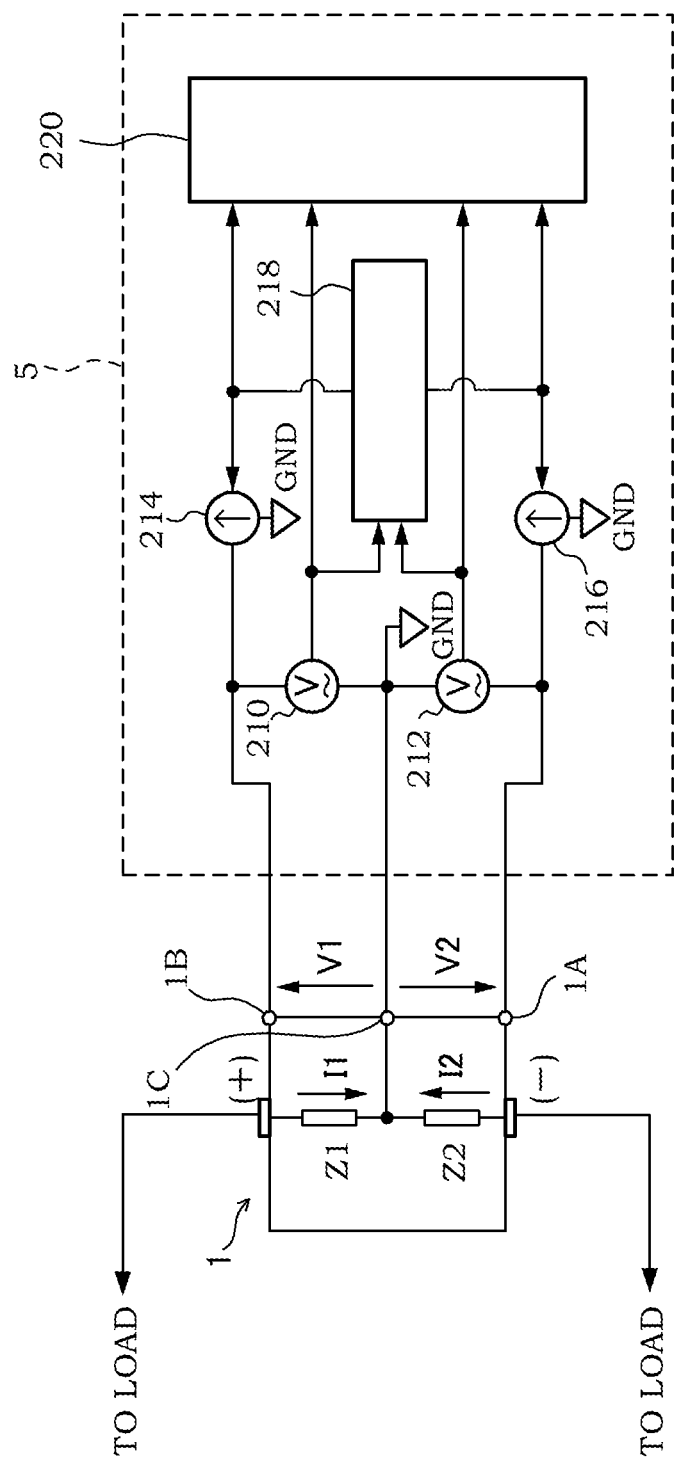
FIG. 14 is a diagram schematically illustrating a configuration of an impedance measurement device according to an embodiment.

FIG. 14 is a block diagram schematically illustrating a configuration of an impedance measurement device 5 according to an embodiment.

As illustrated in FIG. 14, the impedance measurement device 5 is connected to an intermediate terminal 1C in addition to the positive electrode terminal (cathode-side terminal) 1B and a negative electrode terminal (anode-side terminal) 1A of the fuel cell stack 1. Note that a portion connected to the intermediate terminal 1C is grounded as illustrated in FIG. 14.

The impedance measurement device 5 includes a positive-side voltage detection sensor 210 that detects a positive-side AC voltage V1 of the positive electrode terminal 1B against the intermediate terminal 1C, and a negative-side voltage detection sensor 212 that detects a negative-side AC voltage V2 of the negative electrode terminal 1A against the intermediate terminal 1C.

In addition, the impedance measurement device 5 includes a positive-side AC power unit 214 that applies an AC current I1 to a circuit including the positive electrode terminal 1B and the intermediate terminal 1C, a negative-side AC power unit 216 that applies an AC current I2 to a circuit including the negative electrode terminal 1A and the intermediate terminal 1C, a controller 218 that adjusts amplitudes or phases of the AC currents I1 and I2, and an calculation unit 220 that calculates the impedance Z of the fuel cell stack 1 on the basis of the positive-side AC voltages V1 and V2 and the AC currents I1 and I2.

According to this embodiment, the controller 218 adjusts the amplitudes and the phases of the AC currents I1 and I2 such that the positive-side AC voltage V1 and the negative-side AC voltage V2 become equal to each other. Note that this controller 218 may be configured using the controller 6 of FIG. 1.

The calculation unit 220 includes a hardware component such as an AD converter or a microcomputer chip (not shown) and a software component such as a program for calculating the impedance. The calculation unit 220 calculates the internal impedance Z1 from the intermediate terminal 1C to the positive electrode terminal 1B by dividing the positive-side AC voltage V1 by the AC current I1, and calculates the internal impedance Z2 from the intermediate terminal 1C to the negative electrode terminal 1A by dividing the negative-side AC voltage V2 by the AC current I2. In addition, the calculation unit 220 calculates a total internal impedance Z of the fuel cell stack 1 by summing the internal impedances Z1 and Z2.

Using the fuel cell state estimation method according to this embodiment described above, it is possible to obtain the following effects.

In the fuel cell stack estimation method according to this embodiment, the impedance measurement device 5 included in the reaction resistance value decrease detection unit outputs the AC currents I1 and I2 to the fuel cell stack 1 configured as a stacked battery and adjusts the AC currents I1 and I2 on the basis of the positive-side AC voltage V1 which is a voltage obtained by subtracting the potential of the intermediate terminal 1C from the potential of the positive electrode terminal 1B of the fuel cell stack 1 and the negative-side AC voltage V2 which is a voltage obtained by subtracting the potential of the intermediate terminal 1C from the potential of the negative electrode terminal 1A of the fuel cell stack 1. In addition, the impedance measurement device 5 calculates the internal impedance Z of the fuel cell stack 1 on the basis of the adjusted AC currents I1 and I2, the positive-side AC voltage V1, and the negative-side AC voltage V2.

In particular, the impedance measurement device 5 included in the reaction resistance value decrease detection unit adjusts the amplitudes and the phases of the AC current I1 applied by the positive-side AC power unit 214 and the AC current I2 applied by the negative-side AC power unit 216 such that the positive-side AC voltage V1 in the positive electrode side is substantially equal to the negative-side AC voltage V2 of the negative electrode side of the fuel cell stack 1. As a result, the positive-side AC voltage V1 becomes substantially equal to the negative-side AC voltage V2. Therefore, the positive electrode terminal 1B and the negative electrode terminal 1A have potentials substantially equal to each other. Therefore, it is possible to prevent the AC currents I1 and I2 used in impedance measurement from flowing to a load such as a drive motor 53. Accordingly, it is possible to prevent influence on impedance measurement caused by electricity generation of the fuel cell stack 1.

When the internal impedance is measured under an electric generation state of the fuel cell stack 1, a measurement AC potential is overlapped with the voltage generated by this electricity generation. Therefore, the positive-side AC voltage V1 and the negative-side AC voltage V2 increase in their values, but the phases or the amplitudes of the positive-side AC voltage V1 and the negative-side AC voltage V2 do not change. Accordingly, similar to the case where the fuel cell stack 1 does not have the electric generation state, it is possible to measure the internal impedance Z with high accuracy.

While the embodiments of the invention have been described hereinbefore, they are merely for illustrative purposes to show a part of applications of the invention and are not intended to limit the technical scope of the invention to specific configurations of the embodiments described above.

For example, in the aforementioned embodiments, a process of reducing the output power of the fuel cell stack 1 is performed to address oxygen deficiency when it is determined that the fuel cell stack 1 has the oxygen deficiency state, as illustrated in FIG. 5. Alternatively, a control for requesting to lower the oxygen concentration of the cathode 113 of the fuel cell stack 1 (low oxygen concentration control) may be conceived as in a voltage limit control (VLC) performed during a warm-up operation of the fuel cell stack 1 (below-zero activation) or while the operation of the fuel cell stack 1 stops.

Therefore, assuming that fuel cell state determination method according to this embodiment is applied to such a low oxygen concentration control, the process for reducing the oxygen concentration may be performed, for example, when it is determined that the fuel cell stack 1 does not have the oxygen deficiency state.

In the aforementioned embodiments, the oxygen deficiency state of the fuel cell stack 1 is determined by comparing the reaction resistance value Ract of the cathode 113 and the predetermined threshold value Rth. Alternatively, instead of directly using the reaction resistance value Ract of the cathode 113 itself in determination of the oxygen deficiency state, a physical amount including or relating to the reaction resistance value Ract, such as the internal impedance Z or an absolute value of the internal impedance Z, may also be employed.

The invention claimed is:

1. A fuel cell state determination method for determining an internal state of a fuel cell supplied with an anode gas and a cathode gas to generate electricity, comprising:
   detecting a decrease of a reaction resistance value of a cathode caused by hydrogen evolution reaction generated in the cathode as the fuel cell has an oxygen deficiency state;
   determining the oxygen deficiency state on the basis of detection of the decrease of the reaction resistance value,
   wherein the reaction resistance value of the cathode is calculated on the basis of one or more internal impedances of the fuel cell acquired on the basis of one or more frequencies belonging to a predetermined frequency band, and
   the predetermined frequency band is a specific frequency band in which a difference between the reaction resistance value of the cathode during occurrence of the hydrogen evolution reaction and the reaction resistance value of the cathode during non-occurrence of the hydrogen evolution reaction becomes equal to or larger than a predetermined value; and
   when the oxygen deficiency state has been determined, adjusting oxygen gas flow.

2. The fuel cell state determination method according to claim 1, wherein
   the reaction resistance value of the cathode is calculated on the basis of the internal impedances of the fuel cell acquired on the basis of two or more frequencies belonging to the predetermined frequency band.

3. The fuel cell state determination method according to claim 1, wherein
   the fuel cell is determined to have an oxygen deficiency state when the calculated reaction resistance value is equal to or smaller than a predetermined threshold value, and
   the predetermined threshold value is set on the basis of a minimum reaction resistance value which is a minimum value of the reaction resistance value of the cathode obtained by assuming that the fuel cell does not have the oxygen deficiency state.

4. The fuel cell state determination method according to claim 3, wherein
   the minimum reaction resistance value is set considering an I-V characteristic of the fuel cell.

5. The fuel cell state determination method according to claim 2, wherein
   the reaction resistance value of the cathode is calculated on the basis of each imaginary part of the internal impedance.

6. The fuel cell state determination method according to claim 5, wherein the reaction resistance value of the cathode is calculated using two or more formulas obtained by each substituting the two or more frequencies and imaginary parts of respective internal impedances acquired at the two or more frequencies to a formula (1),

[Formula 1]

$$Z_{im} = \frac{-\omega C_{dl} R_{act}^2}{1 + \omega^2 C_{dl}^2 R_{act}^2}, \quad (1)$$

where "Zim" denotes an imaginary part of the internal impedance, "ω" denotes a frequency of an AC signal, "Ract" denotes the reaction resistance value of the cathode, and "Cdl" denotes an electric bilayer capacitance of the cathode.

7. The fuel cell state determination method according to claim 2, further comprising:
   calculating an electrolyte membrane resistance value of the fuel cell; and
   calculating the reaction resistance value of the cathode on the basis of the electrolyte membrane resistance value and each real part of the internal impedance.

8. The fuel cell state determination method according to claim 7, wherein
   the reaction resistance value of the cathode is calculated using two or more formulas obtained by each substituting the two or more frequencies, real parts of respective internal impedances acquired at the two or more frequencies, and the electrolyte membrane resistance value to a formula (2),

[Formula 2]

$$Z_{re} = R_{mem} + \frac{R_{act}}{1 + \omega^2 C_{dl}^2 R_{act}^2}, \quad (2)$$

where "Zre" denotes a real part of the internal impedance, "ω" denotes a frequency of an AC signal, "Rmem" denotes the electrolyte membrane resistance value, "Ract" denotes the reaction resistance value of the cathode, and "Cdl" denotes an electric bilayer capacitance of the cathode.

9. The fuel cell state determination method according to claim 2, wherein the reaction resistance value of the cathode is calculated using both the real part and the imaginary part of the internal impedance.

10. The fuel cell state determination method according to claim 9, further comprising:
    calculating candidates of the reaction resistance value of the cathode on the basis of the respective real part and imaginary part of the internal impedance; and
    determining a smaller one of the respective candidates as the reaction resistance value of the cathode.

11. The fuel cell state determination method according to claim 1, wherein the fuel cell is configured as a stacked battery,
    an AC current is output to the stacked battery,
    the AC current is adjusted on the basis of a positive-side AC voltage which is a voltage obtained by subtracting a potential of an intermediate portion of the stacked battery from a positive-side potential of the stacked battery and a negative-side AC voltage which is a voltage obtained by subtracting a potential of the intermediate portion from a negative-side potential of the stacked battery, and
    the internal impedance of the stacked battery is calculated on the basis of the adjusted AC current, the positive-side AC voltage, and the negative-side AC voltage.

12. A fuel cell state determination apparatus for detecting an internal state of a fuel cell supplied with an anode gas and a cathode gas to generate electricity, comprising:
- a reaction resistance value decrease detection unit configured to detect a decrease of a reaction resistance value of a cathode caused by a hydrogen evolution reaction generated in the cathode as the fuel cell has an oxygen deficiency state; and
- an oxygen deficiency state determination unit configured to determine the oxygen deficiency state of the cathode on the basis of detection of the decrease of the reaction resistance value,
- wherein the reaction resistance value decrease detection unit is configured to acquire one or more internal impedances of the fuel cell on the basis of one or more frequencies belonging to a predetermined frequency band and calculates the reaction resistance value of the cathode on the basis of the acquired internal impedance, and
- the predetermined frequency band is a specific frequency band in which a difference between the reaction resistance value of the cathode during occurrence of the hydrogen evolution reaction and the reaction resistance value of the cathode during non-occurrence of the hydrogen evolution reaction becomes equal to or larger than a predetermined value,
- wherein the apparatus is configured to, when the oxygen deficiency state has been determined, adjust oxygen gas flow.

13. The fuel cell state determination apparatus according to claim 12, wherein
the reaction resistance value decrease detection unit is configured to acquire the internal impedances of the fuel cell on the basis of two or more frequencies belonging to the predetermined frequency band.

14. The fuel cell state determination apparatus according to claim 12, wherein
the oxygen deficiency state determination unit is configured to determine that the fuel cell has the oxygen deficiency state when the calculated reaction resistance value is equal to or smaller than a predetermined threshold value, and
the reaction resistance value decrease detection unit is configured to set the predetermined threshold value on the basis of a minimum reaction resistance value which is a minimum value of the reaction resistance value of the cathode obtained by assuming that the fuel cell does not have the oxygen deficiency state.

15. The fuel cell state determination apparatus according to claim 14, wherein
the reaction resistance value decrease detection unit is configured to set the minimum reaction resistance value considering an I-V characteristic of the fuel cell.

16. The fuel cell state determination apparatus according to claim 13, wherein
the reaction resistance value decrease detection unit is configured to calculate the reaction resistance value of the cathode on the basis of each imaginary part of the internal impedance.

17. The fuel cell state determination apparatus according to claim 13, wherein
the reaction resistance value decrease detection unit is configured to calculate an electrolyte membrane resistance value of the fuel cell and calculates the reaction resistance value of the cathode on the basis of the electrolyte membrane resistance value and each real part of the internal impedance.

18. The fuel cell state determination apparatus according to claim 13, wherein
the reaction resistance value decrease detection unit is configured to calculate the reaction resistance value of the cathode using both the real part and the imaginary part of the internal impedance.

19. The fuel cell state determination apparatus according to claim 12, wherein the fuel cell is configured as a stacked battery, and
the reaction resistance value decrease detection unit is configured to:
output an AC current to the stacked battery,
adjust the AC current on the basis of a positive-side AC voltage which is a voltage obtained by subtracting a potential of an intermediate portion of the stacked battery from a positive-side potential of the stacked battery and a negative-side AC voltage which is a voltage obtained by subtracting a potential of the intermediate portion from a negative-side potential of the stacked battery; and
calculate the internal impedance of the stacked battery on the basis of the adjusted AC current, the positive-side AC voltage, and the negative-side AC voltage.

* * * * *